United States Patent
Shinoda et al.

(10) Patent No.: US 7,847,021 B2
(45) Date of Patent: Dec. 7, 2010

(54) ALIPHATIC POLYESTER RESIN COMPOSITION CONTAINING COPOLYMER

(75) Inventors: Hosei Shinoda, Sodegaura (JP); Takeshi Kashima, Omuta (JP); Masahiro Enna, Sodegaura (JP); Shinichi Kojoh, Sodegaura (JP); Hideyuki Kaneko, Sodegaura (JP); Shingo Matsuo, Sodegaura (JP); Nobuo Kawahara, Sodegaura (JP); Tomoaki Matsugi, Sodegaura (JP); Yuichi Matsuda, Sodegaura (JP); Takayuki Onogi, Sodegaura (JP); Fumio Kageyama, Sodegaura (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 1125 days.

(21) Appl. No.: 10/589,431

(22) PCT Filed: Feb. 9, 2005

(86) PCT No.: PCT/JP2005/001903

§ 371 (c)(1),
(2), (4) Date: Aug. 15, 2006

(87) PCT Pub. No.: WO2005/078017

PCT Pub. Date: Aug. 25, 2005

(65) Prior Publication Data

US 2007/0160861 A1 Jul. 12, 2007

(30) Foreign Application Priority Data

Feb. 16, 2004 (JP) ............................. 2004-038370
Feb. 17, 2004 (JP) ............................. 2004-039166
Feb. 17, 2004 (JP) ............................. 2004-039167

(51) Int. Cl.
C08G 67/00 (2006.01)
C08L 67/00 (2006.01)
C08L 67/04 (2006.01)
C08L 23/10 (2006.01)
C08L 23/26 (2006.01)

(52) U.S. Cl. ............................. 525/63; 525/69; 525/70; 525/78; 525/79; 525/80; 525/81; 525/82; 525/165; 525/166; 525/176; 525/177; 525/326.1; 428/480; 428/500; 428/523

(58) Field of Classification Search ................. None
See application file for complete search history.

(56) References Cited

U.S. PATENT DOCUMENTS 5,216,050 A * 6/1993 Sinclair .................. 524/108
5,444,119 A 8/1995 Fujita et al.
5,683,723 A * 11/1997 Spenlehauer et al. ........ 424/501
5,852,117 A 12/1998 Schoenberg et al.
6,869,985 B2 * 3/2005 Mohanty et al. ............. 523/124
7,049,373 B2 * 5/2006 Matyjaszewski et al. ..... 525/242
7,160,948 B2 * 1/2007 Matsuo et al. ............ 525/92 R
7,354,973 B2 * 4/2008 Flexman ..................... 525/162
2002/0183473 A1 * 12/2002 Matyjaszewski et al. .... 526/335
2005/0151296 A1 7/2005 Obuchi et al.

FOREIGN PATENT DOCUMENTS

| JP | 9-316310 A | 12/1997 |
| JP | 10-251498 A | 9/1998 |
| JP | 11-124495 A | 5/1999 |
| JP | 2002-37987 A | 2/2002 |
| JP | 2004-2773 A | 1/2004 |
| TW | 499456 | 8/2002 |
| WO | WO 00/52094 | * 9/2000 |
| WO | WO 01/53369 | * 7/2001 |
| WO | WO 02/06384 | * 1/2002 |
| WO | WO 02/068485 | * 9/2002 |
| WO | WO 03/082980 | * 10/2003 |

OTHER PUBLICATIONS

Mari Hiljanen-Vainio et al., "Modification of poly(L-lactides) by Blending: Mechanical and Hydrolytic Behavior", Macromol. Chem. Phys., 1996, pp. 1503-1523, vol. 197, Hüthig & Wepf Verlag, Zug.
Kelly S. Anderson et al., "Toughening of Polylactide by Melt Blending with Linear Low-Density Polyethylene", Journal of Applied Polymer Science, 2003, pp. 3757-3768, vol. 89, Wiley Periodicals, Inc.
Polymer ABC Handbooks, Polymer Society, edited by Polymer ABC Research, published Jan. 1, 2001, pp. 372-379.

* cited by examiner

*Primary Examiner*—Vivian Chen
(74) *Attorney, Agent, or Firm*—Buchanan Ingersoll & Rooney PC

(57) ABSTRACT

A modified polyolefin resin comprising a copolymer having a structure that a propylene-based polyolefin segment (a) and a segment (b) containing a lactic acid as a constituent are bonded in a block state and/or a graft state through a vinyl monomer having a hydroxyl group, wherein a number average molecular weight of the propylene-based polyolefin segment (a) is from 1,000 to 100,000, a number average molecular weight of the segment (b) containing lactic acid as a constituent is from 1,000 to 200,000, and a weight composition of the propylene-based polyolefin segment (a) and the segment (b) containing lactic acid as a constituent is from 10/90 to 90/10. The modified polyolefin resin can be used in a resin composition containing an aliphatic polyester resin (A), a polyolefin resin (B) and the modified polyolefin resin (C). The composition can exhibit excellent heat resistance and impact resistance and can be used for molding various parts.

8 Claims, No Drawings

ALIPHATIC POLYESTER RESIN COMPOSITION CONTAINING COPOLYMER

TECHNICAL FIELD

The present invention relates to a resin composition (D) characterized by containing an aliphatic polyester resin (A), a polyolefin resin (B) and a modified polyolefin resin (C), and a resin molded article having excellent heat resistance and impact resistance, obtained from the resin composition (D).

BACKGROUND ART

As awareness over global environmental problems increases, as a result that exhaustion of fossil materials and petroleum resources, and increasing carbon dioxide are seen as problems, research and development of biodegradable resins such as an aliphatic polyester and resins synthesized using plants as a raw material are actively made. Of aliphatic polyesters, a polylactic acid having particularly excellent moldability is brought to attention as a resin originated from plants, using lactic acid obtained by fermentation from grain resources such as corn. However, the polylactic acid has slow crystallization rate and low heat resistance, in addition to the defect that it is hard and brittle, and therefore, had the limit on use expansion. In particular, for example, in the case of a polylactic acid amorphous molding, because a softening point is lower than 60° C., the problem was pointed out that it is liable to cause whitening, deformation and the like under daily use environment. Further, lactic acid-based resins have the defect that impact strength is poor, thus being brittle, because of its rigid molecular structure, and improvement of those properties of lactic acid-based resins is desired.

There is technology called polymer blend or polymer alloy as the technology conventionally known as an improvement method of physical properties of a resin. Various resins are forcedly mixed and kneaded, and improvement in impact resistance, flexibility, rigidity and heat resistance is tried. Some attempts to improve physical properties by mixing dissimilar resins with an aliphatic polyester are carried out. For example, JP-A-10-251498 discloses a polylactic acid-based resin composition having improved impact resistance obtained by mixing 1 to 15% by weight of a syndiotactic polypropylene with a polylactic acid. Further, JP-A-9-316310 discloses a method of improving impact resistance of a polylactic acid by mixing a modified olefin compound with the polylactic acid. Further, JP-A-2002-37987 discloses a polylactic acid composition having improved melting characteristics, mechanical characteristics and impact resistance, obtained by mixing a polylactic acid and a thermoplastic elastomer (ethylene-propylene-diene rubber).

However, a method of improving heat resistance by mixing dissimilar resins with a polylactic acid is scarcely known. In particular, an attempt to improve heat resistance by blending, for example, a polypropylene having fast crystallization rate with a polylactic acid is not known. The above JP-A-10-251498 describes that the polypropylene to be blended uses a small amount of a low crystalline syndiotactic polypropylene having 40% or lower of crystallinity. It is described that where the general high crystalline polypropylene having 60 to 70% of crystallinity is used, mixing dispersion state is poor, which is not preferable. Further, it is described that the amount of the syndiotactic polypropylene used is limited to 15% by weight or less, and when exceeding 15% by weight, a uniform composition is not obtained. Only where a low crystalline syndiotactic polypropylene in a small amount of 15% by weight or less is mixed with a polylactic acid, it is impossible to realize sufficient heat resistance. Compatibility between a polyolefin resin and a polylactic acid-based resin is extremely low, and by merely blending and kneading those, phase separation or non-compatibilization occurs, and it is difficult to obtain expected physical properties (particularly heat resistance).

On the other hand, as a method of improving impact resistance of an aliphatic polyester resin, a method of adding a modified olefin to a polylactic acid is disclosed in, for example, JP-A-10-251498. JP-A-11-124495 discloses a method of adding a copolymer of other flexible aliphatic polyester and a polylactic acid. Further, Non-Patent Document 1 (MACROMOLECULAR CHEMICAL and PHYSICS, published in 1996, vol. 197, pages 1503 to 1523) discloses a method of adding a poly(ε-caprolactone) which is an aliphatic polyester. However, improvement of impact strength by those methods is not sufficient, and it is necessary to add a large amount of modifiers for improving impact strength. This gave the problem that moldability or heat resistance deteriorates.

By the way, as a method of improving impact strength of a resin, a method of dispersing a flexible rubber in a resin is widely known. It is known that when a particle size of the rubber dispersed in the resin is about several μm or smaller, such is effective for the improvement of impact strength. However, it is generally difficult for two kinds of polymers to compatibilize with each other, and as a result, a particle size of the rubber added to the resin becomes very large, and impact strength is not improved. Dispersion state of the rubber can be greatly improved by adding a compatibilizer which improves compatibility between two kinds of polymers, thereby decreasing interfacial tension between dissimilar polymers.

A compound having two kinds of polymers to be compatibilized as the respective block is considered to have excellent effect as a compatibilizer for improving dispersion state of a rubber, and Non-Patent Document 2 (JOURNAL OF APPLIED POLYMER SCIENCE, published in 2003, vol. 89, pages 3757 to 3768) describes that impact strength of a polylactic acid is greatly improved by adding a block polymer of a polylactic acid and a polyethylene to a blend of a polylactic acid and a linear low density polyethylene. However, there was the disadvantage that the block polymer of a polylactic acid and a polyethylene involves complicated polymerization method, and this is liable to increase the cost.

Further, a rubber can be finely dispersed in a resin by improving compatibility between the rubber to be finely dispersed and the resin. One method of improving compatibility between a rubber and a resin is a method of adding a site having good compatibility with a resin to a rubber. For example, it is described in Non-Patent Document 3 (Polymer ABC Handbooks, Polymer Society, edited by Polymer ABC Research, published Jan. 1, 2001, pages 372 to 379) that in a rubber-reinforced polystyrene (HIPS), impact strength is improved by grafting styrene on a rubber, and dispersing the same in a styrene resin. However, differing from a vinyl polymer such as a styrene resin, in an ester condensation polymer such as a polylactic acid resin, it was difficult to produce a block copolymer, a graft copolymer or a random copolymer, with a rubber effective for improving impact strength.

DISCLOSURE OF THE INVENTION

Problems that the Invention is to Solve

The problem that the invention is to solve is to obtain a resin composition (D) having improved heat resistance and impact resistance by improving compatibility between an aliphatic polyester resin (A) and a polyolefin resin (B) and finely dispersing island phases in the resin composition.

Means for Solving the Problems

The present inventors have found that a resin composition (D) containing an aliphatic polyester resin (A), a polyolefin resin (B), and a modified polyolefin resin (C), and a molded article having excellent heat resistance and impact resistance obtained from the resin composition (D) have excellent characteristics that solve the above problems, and reached the invention.

The invention is specified as follows.

(1) A resin composition (D), characterized by containing from 1 to 99 parts by weight of an aliphatic polyester resin (A) and from 99 to 1 parts by weight of a polyolefin resin (B) (provided that the sum of (A) and (B) is 100 parts by weight), and from 0.1 to 100 parts by weight of a modified polyolefin resin (C) to 100 parts by weight of the sum of (A) and (B).

(2) The resin composition (D), characterized in that the modified polyolefin resin (C) contains at least one selected from the group consisting of (C-1), (C-2) and (C-3) in an amount of from 0.1 to 100 parts by weight;

(C-1) a copolymer having a structure that a propylene-based polyolefin segment (a) and a segment (b) containing lactic acid as a constituent are bonded in a block state and/or a graft state through a covalent bond, wherein a number average molecular weight of the propylene-based polyolefin segment (a) is from 1,000 to 100,000, a number average molecular weight of the segment (b) containing lactic acid as a constituent is from 1,000 to 200,000, and a weight composition of the propylene-based polyolefin segment (a) and the segment (b) containing lactic acid as a constituent is from 10/90 to 90/10, (C-2) a copolymer having a structure that a segment containing an acrylic unit as a constituent and an ethylene-based polyolefin segment are bonded in a block state and/or a graft state and/or a random state through a covalent bond, and (C-3) a copolymer having a structure that a segment containing an acrylic unit as a constituent and a propylene-based polyolefin segment are bonded in a block state and/or a graft state and/or a random state through a covalent bond.

(3) A modified polyolefin resin (C-1) comprising a copolymer having a structure that a propylene-based polyolefin segment (a) and a segment (b) containing lactic acid as a constituent are bonded in a block state and/or a graft state through a covalent bond, wherein a number average molecular weight of the propylene-based polyolefin segment (a) is from 1,000 to 100,000, a number average molecular weight of the segment (b) containing lactic acid as a constituent is from 1,000 to 200,000, and a weight composition of the propylene-based polyolefin segment (a) and the segment (b) containing lactic acid as a constituent is from 10/90 to 90/10.

(4) A method of producing the modified polyolefin resin (C-1) according to above (1) to (3), characterized in that a monomer containing lactide or lactic acid is polymerized with a polyolefin resin in the presence of a modified polyolefin resin having a hydroxyl group-containing vinyl monomer grafted thereon, or a polymer of a vinyl monomer and a monomer containing lactide or lactic acid and a polyolefin are reacted.

(5) The resin composition (D) according to the above (1) and (2), wherein the modified polyolefin resin (C-2) is a copolymer having a segment containing an acrylic acid unit as a constituent and an ethylene-based polyolefin block.

(6) The resin composition (D) according to the above (1) and (2), wherein the modified polyolefin resin (C-2) is a copolymer having a segment containing a methyl methacrylate unit as a constituent and an ethylene-based polyolefin block.

(7) The resin composition (D) according to the above (1) and (2), wherein the modified polyolefin resin (C-3) is a copolymer having a segment containing an acrylic acid unit as a constituent and a propylene-based polyolefin block.

(8) The resin composition (D) according to the above (1) and (2), wherein the modified polyolefin resin (C-3) is a copolymer having a segment containing a methyl methacrylate unit as a constituent, and a propylene-based polyolefin block.

(9) A resin composition (D), characterized by obtaining from a resin composition containing from 40 to 99 parts by weight of an aliphatic polyester resin (A), from 60 to 1 parts by weight of a polyolefin resin (B) (provided that the sum of (A) and (B) is 100 parts by weight), and as a modified polyolefin resin (C), from 0.1 to 50 parts by weight of at least one selected from the group consisting of (C-1), (C-2) and (C-3) to 100 parts by weight of the sum of (A) and (B), and having a softening temperature of 60° C. or higher.

(10) A resin composition (D), characterized by obtaining from a resin composition containing from 40 to 99 parts by weight of an aliphatic polyester resin (A), from 60 to 1 parts by weight of a polyolefin resin (B) (provided that the sum of (A) and (B) is 100 parts by weight), and as a modified polyolefin resin (C), from 0.1 to 50 parts by weight of at least one selected from the group consisting of (C-1), (C-2) and (C-3) to 100 parts by weight of the sum of (A) and (B), and having Izod impact strength of 100 J/m or more.

(11) An automobile material part comprising the resin composition (D) according to the above (1).

(12) A home electric appliance material part comprising the resin composition (D) according to the above (1).

(13) An electrical/electronic material part comprising the resin composition (D) according to the above (1).

EFFECT OF THE INVENTION

The present inventors provide a resin composition (D), characterized by containing from 1 to 99 parts by weight of an aliphatic polyester resin (A), from 99 to 1 parts by weight of a polyolefin resin (B) (provided that the sum of (A) and (B) is 100 parts by weight), and from 0.1 to 100 parts by weight of a modified polyolefin resin (C) to 100 parts by weight of the sum of (A) and (B), and a molded article having excellent heat resistance and impact resistance obtained from the resin composition (D).

BEST MODE FOR CARRYING OUT THE INVENTION

The invention is described in detail below.

[Aliphatic Polyester Resin (A)]

The aliphatic polyester resin (A) used in the invention is a polycondensate of a polyvalent carboxylic acid containing a dibasic acid and a polyhydric alcohol containing diol, a polycondensate of hydroxy acid, a ring opening polymerization product of lactone, and the like. Specifically, for example, a polylactic acid, a polyglycolic acid, a lactic acid-glycolic acid copolymer, a polyhydroxybutyrate, a polybutylene succinate, a polyvinyl alcohol, cellulose acetate, a polyethylene succinate, polycaprolactone, a polybutylene succinate adipate denaturation, a polybutylene succinate carbonate denaturation, a polybutylene adipate-terephtahlete, a starch, and the like are exemplified. As the aliphatic polyester resin in the invention, a lactic acid-based resin containing 50 mol % or more of a lactic acid unit as a polymer constituent is preferably used.

The term "lactic acid-based resin" used herein means a polymer composition comprising a polymer, as a main component, which contains L-lactic acid unit and/or D-lactic acid unit in an amount of at least 50 mol % or more, and preferably 75 mol % or more, and is synthesized by polycondensation of lactic acid or ring opening polymerization of lactide which is a cyclic dimer of lactic acid. It may be one in which other monomer copolymerizable with lactic acid is copolymerized.

More preferably, it is a polylactic acid in which the lactic acid unit is 100 mol %. Further, it may be a composition in which other than polymers containing 50 mol % or more of the lactic acid unit, other resins, additives or the like are mixed with the polylactic acid-based resin in a range of not markedly impairing properties of said polymer.

As the monomer copolymerizable with lactic acid, a hydroxycarboxylic acid (for example, glycolic acid, caproic acid and the like), an aliphatic polyhydric alcohol (for example, butanediol, ethylene glycol and the like) and an aliphatic polyvalent carboxylic acid (for example, succinic acid, adipic acid and the like) are exemplified. Where the lactic acid-based resin is a copolymer, a form of arrangement of the copolymer may be any form of a random copolymer, an alternating copolymer, a block copolymer, a graft copolymer, and the like. Further, those may be that at least apart thereof is copolymerized with polyhydric alcohols of bifunctional or more, such as ethylene glycol, diethylene glycol, triethylene glycol, a polyethylene glycol, propylene glycol, dipropylene glycol, an ethylene glycol/propylene glycol copolymer, 1,3-butanediol, 1,4-butanediol, 3-methyl-1,5-pantenediol, 1,6-hexanediol, 1,9-nonanediol, neopentyl glycol, polytetramethylene glycol, glycerin, and trimethylol propane; polyvalent isocyanates such as xylilene diisocyanate and 2,4-tolylene diisocyanate; and polysaccharides such as cellulose, acetyl cellulose and ethyl cellulose, and at least a part thereof may be have any form of, for example, linear cyclic, branched, star and three-dimensional net structures. Thus, there is no any limitation.

Further, weight average molecular weight of the aliphatic polyester resin (A) is preferably from 50,000 to 1,000,000, and more preferably weight average molecular weight is in a range of from 100,000 to 500,000.

[Polyolefin Resin (B)]

The term "polyolefin rein (B)" used in the invention means a polymer comprising repeating units derived from an olefin having from 2 to 20 carbon atoms, and specifically includes homopolymers or copolymers of an olefin selected from olefins having from 2 to 20 carbon atoms. Further, mixtures of polymers of those olefins are included. Where a segment of this polyolefin has a stereo-tacticity, it may be either of an isotactic polyolefin or a syndiotactic polyolefin.

As the olefin having from 2 to 20 carbon atoms, a linear or branched α-olefin, a cyclic olefin, an aromatic vinyl compound, a conjugated diene compound, a non-conjugated diene compound and the like are exemplified. As the linear or branched α-olefin, specifically, ones having from 2 to 20 carbon atoms, and preferably from 2 to 10 carbon atoms, such as ethylene, propylene, 1-butene, 1-pentene, 3-methyl-1-butene, 1-hexene, 4-methyl-1-pentene, 3-methyl-1-pentene, 3-ethyl-1-pentene, 4,4-dimethyl-1-pentene, 4-methyl-1-hexene, 4,4-dimethyl-1-hexene, 4-ethyl-1-hexene, 3-ethyl-1-hexene, 1-octene, 1-decene, 1-dodecene, 1-tetradecene, 1-hexadecene, 1-octadecene and 1-eicosene are exemplified.

As the cyclic olefin, ones having from 3 to 20 carbon atoms, and preferably from 5 to 15 carbon atoms, such as cyclopentene, cycloheptene, norbornene, 5-methyl-2-norbornene, tetracyclododecene, and vinylcyclohexane are exemplified. As the aromatic vinyl compound, styrene and mono- or polyalkyl styrenes such as α-methylstyrene, o-methylstyrene, m-methylstyrene, p-methylstyrene, o,p-dimethylstyrene, o-ethylstyrene and m-ethylstyrene and p-ethylstyrene are exemplified.

As the conjugated diene compound, ones having from 4 to 20 compound, preferably from 4 to 10 carbon atoms, such as 1,3-butadiene, isoprene, chloroprene, 1,3-pentadiene, 2,3-dimethylbutadiene, 4-methyl-1,3-petadiene, 1,3-pentadiene, 1,3-hexadiene and 1,3-octadiene are exemplified. As the non-conjugated diene compound, ones having from 5 to 20, and preferably from 5 to 10, carbon atoms, such as 1,4-pentadiene, 1,4-hexadiene, 1,5-hexadiene, 1,4-octadiene, 1,5-octadiene, 1,6-octadiene, 1,7-octadiene, 2-methyl-1,5-hexadiene, 6-methyl-1,5-heptadiene, 7-methyl-1,6-octadiene, 4-ethylidene-8-methyl-1,7-nonadiene, 4,8-dimethyl-1,4,8-decatriene (DMDT), dicyclopentadiene, cyclohexadiene, dicyclooctadiene, methylene norbornene, 5-vinyl norbornene, 5-ethylidene-2-norbornene, 5-methylene-2-norbornene, 5-isopropylidene-2-norbornene, 6-chloromethyl-5-isopropylidene-2-norbornene, 2,3-diisopropylidene-5-norbornene, 2-ethylidene-3-isopropylidene-5-norbornene and 2-propenyl-2,2-norbornadiene are exemplified.

Further, balance with impact resistance, rigidity, heat resistance and other properties can be taken by appropriately selecting the addition amount and kind of the polyolefin resin (B) added to the resin composition (D) containing the aliphatic polyester resin (A) and the modified polyolefin resin (C). In order to obtain a resin composition having particularly improved heat resistance and impact resistance, it is preferable to use a lactic acid-based resin as the aliphatic polyester resin, and it is more preferable to use a polylactic acid having 2,000 to 1,000,000 of a weight average molecular weight (Mw). On the other hand, a resin composition having heat resistance and impact resistance in combination can be obtained by selecting one having low glass transition point (Tg) as the polyolefin resin. As the polyolefin resin used, it is preferable to use at least one polyolefin having 5,000 to 1,000,000 of a weight average molecular weight (Mw) and fast crystallization rate selected from a polyethylene, an isotactic polypropylene, an atactic block polypropylene and the like, and the isotactic polypropylene is more preferable. Further, as the polyolefin resin for improving impact resistance, it is preferable to use a copolymer of olefins selected from olefins having 2 to 20 carbon atoms.

[Modified Polyolefin Resin (C)]

The modified polyolefin resin (C) according to the invention is a copolymer having a structure that a polyolefin segment and a segment having polarity other than olefin are bonded in block state and/or graft state and/or random state. The segment having polarity can change its molecular chain length according to the object, and may be a monomer or a polymer. Those may be used alone or as mixtures thereof. The modified polyolefin resin (C) is preferably a copolymer having a structure that a polyolefin segment, a segment containing lactic acid as a constituent, and/or a segment containing an acrylic unit as a constituent are bonded in block state and/or graft state and/or random state through a covalent bond, and is more preferably (C-1), (C-2) and/or (C-3) described below. Further, those may be used alone or as mixtures thereof.

(C-1)

(C-1) is a copolymer having a structure that a propylene-based polyolefin segment (a) and a segment (b) containing lactic acid as a constituent are bonded in a block state and/or a graft state through a covalent bond, wherein a number average molecular weight of the propylene-based polyolefin segment (a) is from 1,000 to 100,000, a number average molecular weight of the segment (b) containing lactic acid as a constituent is from 1,000 to 200,000, and a weight composition of the propylene-based polyolefin segment (a) and the segment (b) containing lactic acid as a constituent is from 10/90 to 90/10.

(C-2)

(C-2) is a copolymer having a structure that a segment containing an acrylic unit as a constituent and an ethylene-based polyolefin segment are bonded in a block state and/or a graft state and/or a random state through a covalent bond.

(C-3)

(C-3) is a copolymer having a structure that a segment containing an acrylic unit as a constituent and a propylene-based polyolefin segment are bonded in a block state and/or a graft state and/or a random state through a covalent bond.

[Modified Polyolefin Resin (C-1)]

The modified polyolefin resin (C-1) having a structure that a propylene-based polyolefin segment (a) (hereinafter referred to segment (a)) and a segment (b) containing lactic acid as a constituent (hereinafter referred to segment (b)) are bonded in a block state and/or a graft state through a covalent bond, according to the invention is described below.

The segment (a) contains propylene in an amount of at least 1 mol % or more, preferably 10 mol % or more, and more preferably 50 mol % or more, as a constituent unit. As other constituent, α-olefins such as ethylene and α-olefins having from 4 to 20 carbon atoms are exemplified, and specifically 1-butene, 1-pentene, 1-hexene, 1-octene, 1-decene, 1-dodecene, 1-tetradecene, 1-hexadecene, 1-octadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene and the like are exemplified. Those can be used in one kind alone or as a combination of two or more thereof. As the segment of the modified polyolefin resin (C-1) useful for the resin composition (D) having improved heat resistance, it is particularly preferable that the polyolefin segment (a) is a propylene-based polyolefin.

Number average molecular weight of the segment (a) is from 1,000 to 100,000, preferably from 2,000 to 80,000, and more preferably from 3,000 to 50,000.

The segment (b) contains lactic acid as a constituent in an amount of 1 mol % or more, preferably 10 mol % or more, and more preferably 50 mol % or more, and as other constituent, a hydroxycarboxylic acid (for example, glycolic acid and caproic acid), an aliphatic polyhydric alcohol (for example, butanediol and ethylene glycol) and an aliphatic polyvalent carboxylic acid (for example, succinic acid and adipic acid) are exemplified. Those can be used in one kind alone or combinations of two kinds or more thereof. As the segment of the modified polyolefin resin (C-1) useful for the resin composition (D) having improved heat resistance and impact resistance, it is preferable that the segment (b) containing lactic acid as a constituent is a lactic acid-based resin.

Number average molecular weight of the segment (b) is from 1,000 to 200,000, preferably from 2,000 to 100,000, and more preferably from 3,000 to 80,000. Where the molecular weight of the segment (b) is more than 200,000, viscosity of the modified polyolefin resin (C-1) increases, and it is difficult to be dispersed in the resin composition (D). Where the molecular weight of the segment (b) is less than 1,000, performance as a compatibilizer deteriorates, and dispersion particle size of an island phase becomes large.

Weight composition of the segment (a) and the segment (b) is from 1/99 to 90/10, preferably from 5/95 to 20/80, and more preferably from 10/90 to 70/30.

The modified polyolefin resin (C-1) means a copolymer having s structure that the segment (a) and the segment (b) are bonded in block state and/or graft state through a covalent bond, preferably an ester bond.

The term "graft" used in the invention shows a state that a monomer and/or a polymer are bonded in a polymer chain through a covalent bond, and the site of the covalent bond in the polymer chain may be any of a polymer main chain, a side chain and an end, and may be plural sites.

Production method of the modified polyolefin resin (C-1) is not particularly limited. Conventionally used methods can be used. For example, a copolymer in which a propylene-based series polyolefin segment and a segment containing lactic acid as a constituent are bonded in block state can be produced by the method disclosed in, for example, JP-A-2001-270924. That is, it is a method in which a polyolefin having a terminal having Group 13 element bonded thereto or an unsaturated bond terminal on at least one terminal is produced, said terminal is converted into hydroxyl group, aluminum oxide or the like, and lactide or lactic acid is polymerized in the presence of said polyolefin.

One of the preferable production methods of the modified polyolefin resin (C-1) according to the invention is a method of polymerizing a monomer containing lactide or lactic acid in the presence of the modified polyolefin resin in which a vinyl monomer having hydroxyl group was grafted on the polyolefin resin.

The modified polyolefin resin used as the segment (a) in the invention is a graft modified polyolefin resin in which a vinyl monomer (a2) having hydroxyl group is graft polymerized on a polyolefin resin (a1). The grafting amount of the vinyl monomer (a2) having hydroxyl group is from 0.1 to 10% by weight, preferably from 0.5 to 10% by weight, and more preferably from 1 to 10% by weight, to the sum of the polyolefin resin (a1) and the vinyl monomer (a2).

The polyolefin resin (a1) is preferably a propylene-based polyolefin, and can use a homopolymer of propylene, or a random or block copolymer of propylene and other α-olefin. The other α-olefin copolymerized with propylene is ethylene or other α-olefin having from 4 to 20 carbon atoms, and specifically, 1-butene, 1-pentene, 1-hexene, 1-octene, 1-decene, 1-dodecene, 1-tetradecene, 1-hexadecene, 1-octadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene and the like are exemplified. Those can be used in one kind alone or as a combination of two kinds or more thereof.

Melting point (Tm) of the polyolefin resin (a1) measured by DSC is from 70 to 180° C., and preferably from 90 to 170° C.

As the vinyl monomer (a2) having hydroxyl group to be grafted on the polyolefin resin (a1), for example, 2-hydroxyethyl methacrylate (HEMA), 2-hydroxyethyl acrylate, 2-hydroxypropyl methacrylate, 2-hydroxypropyl acrylate and the like can be exemplified. Among those, 2-hydroxyethyl methacrylate (HEMA) is most preferable. The vinyl monomer having hydroxyl group can be used in one kind alone or as combinations of two kinds or more thereof.

In order to produce the segment (a) used in the invention, the conventional methods can be employed. After mixing the polyolefin resin (a1), the vinyl monomer (a2) having hydroxyl group, and a radical polymerization initiator (c), it can be melt kneaded with, for example, an extruder.

The blending proportion of the polyolefin resin (a1) and the vinyl monomer (a2) having hydroxyl group is not particularly limited so far as the polypropylene-based polyolefin segment (a) with the above grafting amount is obtained. However, it is desirable that the proportion of the vinyl monomer (a2) having hydroxyl group is generally from 0.1 to 20 parts by weight, preferably from 0.5 to 15 parts by weight, and more preferably from 1 to 10 parts by weight, per 100 parts by weight of the polyolefin resin (a1).

As the radical polymerization initiator (c) used in graft polymerizing the vinyl monomer (a2) having hydroxyl group on the polyolefin resin (a1), specifically 3,5,5-trimethylhexanoyl peroxide (1), octanoyl peroxide (2), decanoyl peroxide (3), lauroylperoxide (4), succinicperoxide (5), acetylperoxide (6), t-butylperoxy(2-ethylhexanoate) (7), m-toluoyl peroxide (8), benzoyl peroxide (9), t-butylperoxyisobutyrate (10), 1,1-bis(t-butylperoxy)-3,5,5-trimethylcyclohexane (11), 1,1-bis(t-butylperoxy) cyclohexane (12), t-butylperoxymaleic acid (13), t-butylperoxylaurate (14), t-butylperoxy-3,5,5-trimethylcyclohexanoate (15), cyclohexanone peroxide (16), t-butylperoxyisopropyl carbonate (17), 2,5-dimethyl-2,5-di(benzoylperoxy)hexane (18), t-butylperoxyacetate (19), 2,2-bis(t-butylperoxy)butane (20), t-butylperoxybenzoate (21), n-butyl-4,4-bis(t-butylperoxy)valerate (22), di-t-butylperoxyisophthalate (23), methyl ethyl ketone peroxide (24), α,α'-bis(t-butylperoxyisopropyl)benzene (25), dicumyl peroxide (26), 2,5-dimethyl-2,5-di(t-butylperoxy)hexane (27), t-butylcumyl peroxide (28), diisopropylbenzene hydroperoxide (29), di-t-butyl peroxide (30), p-methanehydroperoxide (31), 2,5-dimethyl-2,5-di(t-butylperoxy)hexine-3 (32), 1,1,3,3-tetramethylbutyl-hydroperoxide (33), 2,5-dimethylhexane-2,5-dihydroperoxide (34), cumene hydroperoxide (35), t-butylhydroperoxide (36) and the like are exemplified. Of those, compounds (12) to (36) are particularly preferable.

The blending amount of the radical polymerization initiator (c) is from 0.01 to 10 parts by weight, preferably from 1 to 10 parts by weight, and more preferably from 1 to 5 parts by weight, per 100 parts by weight of the polyolefin resin (a1). Where the blending amount of the radical polymerization initiator (c) is less than 0.01% by weight, graft polymerization of the vinyl monomer (a2) having hydroxyl group and formation of radical initiation point to the polyolefin resin (a1) are insufficient. As a result, it becomes difficult to obtain the polypropylene-based polyolefin segment (a) exhibiting sufficient improvement effect in processability. Further, where exceeding 10 parts by weight, the radical polymerization initiator (c) is excess, and as a result, the molecular weight of the polypropylene-based polyolefin segment (a) decreases, resulting in being difficult to put into practical use.

The production method of the modified polyolefin resin (C-1) according to the invention includes a method of polymerizing a monomer comprising lactide or lactic acid as a main component in the presence of the polypropylene-based series polyolefin segment (a). Because lactide, lactic acid or other monomer polymerizes from hydroxyl group contained in the polypropylene=based polyolefin segment (a), the modified polyolefin resin (C-1) having s structure that the segment (b) containing lactic acid as a constituent and the propylene-based polyolefin segment (a) are bonded in block state and/or graft state through a covalent bond is formed.

As the other monomer other than the lactide and lactic acid, cyclic esters (lactones) such as caprolactone, propiolactone and butyrolactone, and hydroxyalkanes such as hydroxybutane and hydroxypropane can be used.

The blending amount of the lactide and lactic acid and the other monomer other than the lactide and lactic acid is from 1 to 10,000 parts by weight, preferably from 5 to 5,000 parts by weight, and more preferably from 10 to 1,000 parts by weight, per 100 parts by weight of the propylene-based polyolefin segment (a).

In conducting polymerization of lactide, lactic acid or the other monomer, a solvent is preferably used. For example, aliphatic hydrocarbons such as hexane, heptane and decane; alicyclic hydrocarbons such as cyclopentane and cyclohexane; aromatic hydrocarbons such as benzene, toluene and xylene; ether series solvents such as diethyl ether, dioxane, tetrahydrofuran (THF) and diglyme; and the like are used. Those solvents can be used in one kind alone or as combinations of two kinds or more thereof. The aromatic hydrocarbon and ether series solvent are preferably used from the points of solubility of lactide or lactic acid, reaction temperature, reaction rate, easiness of solvent removal after completion of the reaction, and the like. Xylene and toluene are particularly preferable. The amount of the solvent used is selected in a range of from 0.1 to 20 times the total weight of the propylene-based polyolefin segment (a) and lactide or lactic acid. 0.5 to 3 times are particularly preferable.

In the production method of the modified polyolefin resin (C-1) according to the invention, when lactide or lactic acid is polymerized in the presence of the propylene-based series polyolefin segment (a), the conventional catalysts can be used as the catalyst. A tin series catalyst or an aluminum series catalyst is preferable. When lactide is polymerized, tin octanoate is preferably used, and its amount is from 0.01 to 5% by weight to the lactide.

The polymerization temperature is appropriately selected from a range of from 60 to 230° C. Preferably, the temperature is from 100 to 200° C. For example, when lactide is reacted with the modified polyolefin resin using xylene as the solvent and using tin octanoate as the catalyst, the reaction temperature is preferably from about 110 to 150° C.

On the other hand, the modified polyolefin resin (C-1) can also be obtained by polymerizing the vinyl monomer having hydroxyl group and the monomer comprising lactide or lactic acid as a main component to obtain the segment (b2) having vinyl group, which contain lactic acid as a constituent, mixing the polyolefin resin (a1) and the radical polymerization initiator (c), and melt kneading with, for example, an extruder.

For example, the segment (b2) having vinyl group, which contains lactic acid as a constituent can be obtained by polymerizing 100 parts by weight of the lactide, lactic acid or other monomer and from 0.001 to 20 parts by weight of the vinyl monomer (a2).

As the other monomer other than the lactide and lactic acid, cyclic esters (lactones) such as caprolactone, propiolactone and butyrolactone, and hydroxyalkanoic acids such as hydroxybutanoic aid and hydroxypropanoic acid can be used.

In conducting polymerization of lactide, lactic acid or other monomer, a solvent may be used. For example, aliphatic hydrocarbons such as hexane, heptane and decane; alicyclic hydrocarbons such as cyclopentane and cyclohexane; aromatic hydrocarbons such as benzene, toluene and xylene; ether series solvents such as diethyl ether, dioxane, tetrahydrofuran (THF) and diglyme; and the like are used. Those solvent can be used in one kind alone or as combinations of two kinds or more thereof. The aromatic hydrocarbon and ether series solvent are preferably used from the points of solubility of lactide or lactic acid, reaction temperature, reaction rate, easiness of solvent removal after completion of the reaction, and the like. Xylene and toluene are particularly preferable. The amount of the solvent used is selected in a range of from 0.1 to 20 times the total weight of the vinyl monomer (a2) and lactide or lactic acid. Particularly preferably, the amount is 0.5 to 3 times.

In the production method of the segment (b2) having vinyl group, which contains lactic acid as a constituent according to the invention, when lactide or lactic acid is polymerized in the presence of the vinyl monomer (a2), the conventional catalysts can be used as the catalyst. A tin series catalyst or an aluminum series catalyst is preferable. When lactide is polymerized, tin octanoate is preferably used, and its amount is from 0.001 to 5% by weight to the lactide.

The polymerization temperature is appropriately selected from a range of from 60 to 230° C. Preferably, the temperature is from 100 to 200° C. For example, when lactide is reacted with the vinyl monomer (a2) using xylene as the solvent and using tin octanoate as the catalyst, the reaction temperature is preferably from about 120 to 180° C.

Next, the modified polyolefin resin (C-1) can be obtained by mixing the obtained segment (b2) having vinyl group, which contains lactic acid as a constituent, and the polyolefin resin (a1) in the same manner as obtaining the polypropylene-based olefin segment (a).

The polyolefin resin (a1) is preferably a propylene-based polyolefin, and a homopolymer of propylene, or a random or block copolymer of propylene and the other α-olefin can used. The other α-olefin copolymerized with propylene is ethylene or other α-olefin having from 4 to 20 carbon atoms, and specifically, 1-butene, 1-pentene, 1-hexene, 1-octene, 1-decene, 1-dodecene, 1-tetradecene, 1-hexadecene, 1-octadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene and the like are exemplified. Those can be used in one kind alone or as a combination of two kinds or more thereof.

The blending proportion of the polyolefin resin (a1) and the segment (b2) having vinyl group, which contains lactic acid as a constituent is not particularly limited. However, it is desirable that the proportion of the segment (b2) having vinyl group, which contains lactic acid as a constituent is generally from 1 to 10,000 parts by weight, preferably from 5 to 5,000 parts by weight, and more preferably from 10 to 1,000 parts by weight, per 100 parts by weight of the polyolefin resin (a1)

As the radical polymerization initiator (c) used in melt kneading segment (b2) having vinyl group, which contains lactic acid as a constituent, with the polyolefin resin (a1), specifically 3,5,5-trimethylhexanoyl peroxide (1), octanoyl peroxide (2), decanoyl peroxide (3), lauroyl peroxide (4), succinic peroxide (5), acetyl peroxide (6), t-butylperoxy(2-ethylhexanoate) (7), m-toluoyl peroxide (8), benzoyl peroxide (9), t-butylperoxyisobutyrate (10), 1,1-bis(t-butylperoxy)-3,5,5-trimethylcyclohexane (11), 1,1-bis(t-butylperoxy) cyclohexane (12), t-butylperoxymaleic acid (13), t-butylperoxylaurate (14), t-butylperoxy-3,5,5-trimethylcyclohexanoate (15), cyclohexanone peroxide (16), t-butylperoxyisopropyl carbonate (17), 2,5-dimethyl-2,5-di(benzoylperoxy)hexane (18), t-butylperoxyacetate (19), 2,2-bis(t-butylperoxy)butane (20), t-butylperoxybenzoate (21), n-butyl-4,4-bis(t-butylperoxy)valerate (22), di-t-butylperoxyisophthalate (23), methyl ethyl ketone peroxide (24), α,α'-bis(t-butylperoxyisopropyl)benzene (25), dicumyl peroxide (26), 2,5-dimethyl-2,5-di(t-butylperoxy)hexane (27), t-butylcumyl peroxide (28), diisopropylbenzene hydroperoxide (29), di-t-butyl peroxide (30), p-methanehydroperoxide (31), 2,5-dimethyl-2,5-di(t-butylperoxy)hexine-3 (32), 1,1,3,3-tetramethylbutyl-hydroperoxide (33), 2,5-dimethylhexane-2,5-dihydroperoxide (34), cumene hydroperoxide (35), t-butylhydroperoxide (36) and the like are exemplified. Of those, compounds (12) to (36) are particularly preferable.

It is desirable that the blending amount of the radical polymerization initiator (c) is from 0.01 to 10 parts by weight, preferably from 0.1 to 10 parts by weight, and more preferably from 0.2 to 5 parts by weight, to the sum of the polyolefin resin (a1) and the segment (b2) containing lactic acid as a constituent.

As above, the modified polyolefin resin (C-1) having a structure that the polypropylene-based polyolefin segment (a) and the segment (b) containing lactic acid as a constituent are bonded in a block state and/or a graft state through a covalent bond can be produced, and this (C-1) can suitably be used as a compatibilizer for the resin composition (D) comprising the aliphatic polyester resin (A) and the polyolefin resin (B).

Whether the modified polyolefin resin (C-1) according to the invention contains a copolymer having a structure that the polypropylene-based polyolefin segment (a) and the segment (b) containing lactic acid as a constituent are bonded in a block state and/or a graft state through a covalent bond can be judged by, for example, molecular weight of the polymer obtained, solubility in an organic solvent, or spectral analysis. That is, it can be interpreted that the desired block copolymer can be produced by that the molecular weight of the copolymer obtained by the method of the invention shows high value to the molecular weight of the polypropylene-based polyolefin segment (a) used when polymerizing lactide or lactic acid; the dissolution behavior that the copolymer obtained by the method of the invention shows to an organic solvent, differs from the dissolution behavior of the polylactic acid-based resin or the used polyolefin to the organic solvent; or the terminal structure of the copolymer obtained by the method of the invention is analyzed with nuclear magnetic resonance spectrum (NMR) to detect a peak derived from a chemical bond between the propylene-based polyolefin segment (a) and the segment (b) containing lactic acid.

Further, the molecular weight of the modified polyolefin resin (C-1) according to the invention can be measured by the conventional method. For example, it can be measured with a gel permeation chromatography (GPC) using 1,2-dichlorobenzene as a solvent. Further, the copolymer compositional ratio between the propylene-based polyolefin segment (a) and the segment (b) containing lactic acid as a constituent, in the modified polyolefin resin (C-1) can be known by the conventional method. For example, it can be known by dissolving the copolymer in deuterated 1,2-dichlorobenzene, and measuring proton NMR spectrum at 120° C. The molecular weight of each segment can be known from the molecular weight of the modified polyolefin resin (C-1) and the compositional ratio of each segment. For example, in the case that the number average molecular weight of the copolymer is 40,000, and the compositional ratio of the propylene-based polyolefin segment (a) and the segment (b) containing lactic acid as a constituent is 1:1, the molecular weight of the propylene-based polyolefin segment (a) is 20,000, and the molecular weight of the segment (b) containing lactic acid as a constituent is 20,000.

[Modified Polyolefin Resin (C-2)]

The modified polyolefin resin (C-2) in the invention is a copolymer having a structure that the segment containing an acrylic unit as a constituent and the ethylene-based polyolefin segment are bonded in a block state and/or a graft state and/or a random state through a covalent bond. In the segment containing an acrylic unit as a constituent, it is necessary to contain the acrylic unit at least 50 mol % or more, and it is preferable to contain 75 mol % or more. As the acrylic unit, an acrylic acid unit is preferable, and as the preferable examples, a methyl methacrylate unit, a methyl acrylate unit, an ethyl acrylate unit and a butyl acrylate unit can be exemplified. Those constituents may be contained in plural.

Further, the term "ethylene-based polyolefin" used in the invention means a polyolefin containing at least 1 mol % or more of an ethylene unit as a polymer constituent unit. Where 1 mol % or more of ethylene is copolymerized, 2 or more of the monomers described in the polyolefin resin (B) may be selected and copolymerized, and in the case of a copolymer, its structure may be either of a random copolymer, a block copolymer, a graft copolymer, and the like.

Further, the structure of the modified polyolefin resin (C-2) may be that the segment containing an acrylic unit as a constituent and the ethylene-based polyolefin segment take either of a random block copolymer, a block copolymer, a graft copolymer and the like, and there is no any limitation.

Further, the copolymer compositional ratio of the segment containing an acrylic unit as a constituent and the ethylene-based polyolefin segment in the modified polyolefin resin (C-2) can be known by the conventional method. For example, it can be known by dissolving the copolymer in deuterated 1,2-dichlorobenzene, and measuring proton NMR spectrum at 120° C. The composition of the modified polyolefin resin (C-2) can appropriately be changed depending on the object. The composition is that the weight ratio of the segment containing an acrylic unit as a constituent and the ethylene-based polyolefin segment is preferably from 10/90 to 90/10, and more preferably from 20/80 to 80/20.

[Modified Polyolefin (C-3)]

In the invention, the modified polyolefin resin (C-3) is a copolymer having a structure that the segment containing an acrylic unit as a constituent and the propylene-based polyolefin segment are bonded in a block state and/or a graft state and/or a random state through a covalent bond. In the segment containing an acrylic unit as a constituent, it is necessary to contain at least 50 mol % or more of the acrylic unit, and it is preferable to contain 70 mol % or more. As the acrylic unit, an acrylic acid unit is preferable, and as the preferable examples, a methyl methacrylate unit, a methyl acrylate unit, an ethyl acrylate unit and a butyl acrylate unit can be exemplified. Those constituents may be contained in plural.

The term "propylene-based polyolefin" used in the invention means a polyolefin containing at least 1 mol % or more of a propylene unit as a polymer constituent unit.

The structure of the propylene-based polyolefin segment means a polymer comprising a repeating unit derived from an olefin having from 2 to 20 carbon atoms, as entirely the same as in the case of the polyolefin resin (B), and specifically is a homopolymer or a copolymer of an olefin selected from olefins having from 2 to 20 carbon atoms. In the case that this polyolefin segment has a stereo regularity, it may be either of an isotactic polyolefin and a syndiotactic polyolefin, and in the case of a copolymer, its structure may take either of a random copolymer, a block copolymer, a graft copolymer, and the like.

Further, the copolymer compositional ratio of the segment containing an acrylic unit as a constituent and the propylene-based polyolefin segment in the modified polyolefin resin (C-3) can be known by the conventional method. For example, it can be known by dissolving the copolymer in deuterated 1,2-dichlorobenzene, and measuring proton NMR spectrum at 120° C. The composition of the modified polyolefin resin (C-3) can appropriately be changed depending on the object. The composition is that the weight ratio of the segment containing an acrylic unit as a constituent and the propylene-based polyolefin segment is preferably from 10/90 to 90/10, and more preferably from 20/80 to 80/20.

[Resin Composition (D)]

The resin composition (D) according to the invention is a resin composition (D) containing the aliphatic polyester resin (A), the polyolefin resin (B), and the modified polyolefin resin (C), and as the compositional ratio of the resin composition (D) shown in the invention, to from 1 to 99 parts by weight of the aliphatic polyester resin (A) and from 99 to 1 parts by weight of the polyolefin resin (B) (provided that the sum of (A) and (B) is 100 parts by weight), the modified polyolefin resin (C) is from 0.1 to 100 parts by weight, preferably to from 10 to 90 parts by weight of the aliphatic polyester resin (A) and from 90 to 10 parts by weight of the polyolefin resin (B) (provided that the sum of (A) and (B) is 100 parts by weight), the modified polyolefin resin (C) is from 0.5 to 50 parts by weight, and more preferably, to from 20 to 80 parts by weight of the aliphatic polyester resin (A) and from 80 to 20 parts by weight of the polyolefin resin (B) (provided that the sum of (A) and (B) is 100 parts by weight), the modified polyolefin resin (C) is from 1 to 20 parts by weight.

By that the modified polyolefin resin (C) is contained, compatibility between the aliphatic polyester resin (A) and the polyolefin resin (B) improves, and the resin composition (D) having those well dispersed is formed. Improvement of compatibility and dispersibility can be confirmed by, for example, observing a cross-section of the resin composition with an electron microscope or the like. By adding the modified polyolefin resin (C), it can be confirmed that either phase of the polyolefin resin (B) or the aliphatic polyester resin (A) becomes a size (diameter, thickness, and the like) of 100 μm or less. In a preferable case, it becomes 20 μm or less, and in more preferable case, it becomes 5 μm or less. By adding the modified polyolefin resin (C), compatibility between the aliphatic polyester resin (A) and the polyolefin resin (B) increases, and dispersibility of island phase in the resin composition (D) improves, thereby not only heat resistance of the aliphatic polyester resin (A) improves, but impact resistance, tensile elongation, tensile strength, flexural strength, low temperature durability, tear strength and the like improve.

In particular, in order to obtain the resin composition (D) having improved heat resistance, it is preferable to use at least one of polyolefins (Mw: 5,000 to 1,000,000) having high crystallization rate selected from a polyethylene, an isotactic polypropylene, an isotactic block polypropylene, and the like as the polyolefin resin (B), and use a polylactic acid (Mw: 2,000 to 1,000,000) as the aliphatic polyester resin (A).

As the polyolefin resin (B), the intrinsic viscosity [η] measured in decalin at 135° C. is from 0.01 to 15 dl/g, and preferably from 0.1 to 10 dl/g. The kind of the polyolefin resin (B) can change depending on the object. In the case of improving impact resistance of the aliphatic polyester, the glass transition point (Tg) measured by DSC is preferably 0° C. or lower, and −30° C. or lower is more preferable. In order to improve heat resistance of the aliphatic polyester, in the case of a polyethylene, the melting point (Tm) measured by DSC is preferably from 70 to 130° C., and in the case of a polypropylene, the melting point (Tm) measured by DSC is preferably from 70 to 180° C., further preferably from 100 to 170° C., and more preferably from 120 to 160° C.

In particular, in the case of using a polypropylene as the polyolefin resin (B) for the purpose of improving heat resistance, a polypropylene having high stereo regularity and wide molecular weight distribution is preferable. Specifically, a polypropylene in which an isotactic pentad fraction (mmmm fraction) measured by $^{13}$C-NMR spectrum of a component (X) insoluble in 23° C. paraxylene is 97% or more, and a molecular weight distribution represented by Mw/Mn determined by a gel permeation chromatography (GPC) is from 6 to 20 is preferable.

[Additives]

To the resin composition (D) according to the invention, other resin or polymer, or various additives can be added according to the purpose (for example, improvement of moldability, secondary processability, degradation property, tensile strength, heat resistance, storage stability, weather resistance, and flame retardancy). As the other resin or polymer to be added, an unmodified polyolefin, a vinyl resin, a polystyrene, a polyamide, an acrylic resin, a polyphenylene sulfide resin, a polyether ether ketone resin, a polyester, a polysulfone, a polyphenylene oxide, a polyimide, a polyether imide, an acrylonitrile-butadiene-styrene copolymer (ABS), an ethylene-α-olefin copolymer rubber, a conjugated diene rubber, a styrene rubber, a phenolic resin, a melamine resin, a polyester resin, a silicone resin, an epoxy resin, and the like are exemplified. Those resins can be added in one kind or two kinds or more. Preferably, it is a styrene rubber, and specifically, it is a styrene-butadiene-styrene SBS rubber, a styrene-butadiene-butylene-styrene SBBS rubber, a styrene-ethylene-butylene-styrene SEBS rubber, and a maleation-modified SEBS, a maleation-modified SBBS, an imino-modified SEBS, and imino-modified SBBS, obtained by modifying those with acid/base, or the like. Further preferably, the styrene-ethylene-butylene-styrene SEBS rubber and the styrene-butadiene-butylene-styrene SBBS rubber, that were imino-modified are desirable. It is preferable that the addition amount of the other resin or polymer is from 0.1 to 30 parts by weight to from 1 to 99 parts by weight of the aliphatic polyester resin (A) and from 99 to 1 parts by weight of the polyolefin resin (B) (provided that the sum of (A) and (B) is 100 parts by weight), according to the purpose of use in a range that does not impair the object of the invention.

As the various additives, a plasticizer, an antioxidant, an ultraviolet absorber, a heat stabilizer, a flame retardant, an internal release agent, an inorganic additive, an antistatic agent, a surface wet improver, an incineration auxiliary, a pigment, a dye, a nucleating agent, a lubricant, a natural substance, and the like can be exemplified. Preferably, a plasticizer is exemplified. As the specific plasticizer, triacetin, triethylene glycol diacetate, triethyl acetyl citrate, tributyl acetyl citrate, dibutyl sebacate, and the like are exemplified.

Further, in T die extrusion molding, to improve blocking prevention or slipperiness of a film or a sheet, an inorganic additive or a lubricant (aliphatic carboxylic amides) can also be added. As the inorganic additive, silica, mica, talc, glass fiber, glass beads, kaolin, kaolinite, barium sulfate, calcium sulfate, magnesium hydroxide, wollastonite, carbon fiber, calcium silicate fiber, magnesium oxysulfate fiber, potassium titanate fiber, calcium sulfite, white carbon, clay, montmorillonite, titanium oxide, zinc oxide and the like are exemplified. In particular, mica, talc, glass fiber, carbon fiber and calcium carbonate are preferable. Those can be used in one kind or as mixtures of two kinds or more. In particular, by using glass fiber as the inorganic additive, improvement in heat resistance of the resin composition can be expected. Further, as the organic additive, starch and its derivatives, cellulose and its derivatives, pulp and its derivatives, paper and its derivatives, wheat flour, bean cured refuse, bran, coconut shell, coffee cake, protein, phthalic acid-based, aliphatic polybasic acid-based, glycerin-based, citric acid-based, glycol-based and olefin-based low molecular weight substances as a plasticizer, polyethylene terephthalate fiber, polyethylene naphthalate fiber and aramide filber as the organic fiber, and the like are exemplified. In particular, by using the plasticizer, the glass transition point (Tg) of the aliphatic polyester resin (A) lowers, thereby improvement in heat resistance, impact resistance, ductility and the like can be expected. Further, by using the organic fiber, heat resistance improvement can be expected. Those can be used in one kind or as mixture of two kinds or more.

It is preferable that the addition amount of each of those various additives is from 0.1 to 30 parts by weight to from 1 to 99 parts by weight of the aliphatic polyester resin (A) and from 99 to 1 parts by weight of the polyolefin resin (B) (provided that the sum of (A) and (B) is 100 parts by weight), depending on the purpose of use in a range that does not impair the object of the invention.

[Production Method of Resin Composition (D)]

Regarding methods of producing the resin composition (D) containing the aliphatic polyester resin (A), the polyolefin resin (B) and the modified polyolefin resin (C), according to the invention, and the composition in which, according to need, other modifier was added to the above resin composition, in general, the conventional method for producing a resin composition comprising a thermoplastic resin can appropriately be employed. For example, a method of previously mixing uniformly using a high speed stirring machine, a low speed stirring machine or the like, and thereafter melt kneading with a single screw or multiple screw extruder having sufficient kneading ability at a melting point or higher of a resin, a method of mixing and kneading when melting, a method of mixing in a solution, and thereafter removing a solvent, or the like can be employed.

Production of the resin composition (D) may be conducted before molding a molded article, or production and molding may be conducted simultaneously. In the case of producing the resin composition before molding, the shape of the resin composition is generally preferably pellets, rod shape, powder or the like.

[Molded Article of Resin Composition (D)]

The production method of a molded article (E) obtained from the resin composition (D) containing the aliphatic polyester resin (A), the polyolefin resin (B) and the modified polyolefin resin (C), according to the invention can employ the conventionally used method. For example, it can be produced by using the following methods.

(1) In extrusion molding, the resin composition according to the invention is molded with a general T die extrusion molding machine, thereby a film or a sheet can be formed.

(2) In injection molding, pellets of the resin composition according to the invention are melt-softened, and charged in a mold, and a molded article is obtained in a molding cycle of from 20 to 90 seconds.

(3) In blow molding (injection blow molding, stretching blow molding or direct blow molding), for example, in the injection blow molding, pellets of the resin composition according to the invention are melted and charged in a mold to obtain a pre-molded article with a general injection blow molding machine. The pre-molded article obtained is again heated in an oven (heating furnace), and placed in a mold maintained at a certain temperature, and pressurized air is introduced to perform blowing, thereby a blow bottle can be molded.

(4) In vacuum forming/vacuum pressure forming, the film or sheet molded by the same method as the extrusion molding of the above (1) is used as a pre-molded article. The pre-molded article obtained is heated to once soften, and is subjected to vacuum forming or vacuum pressure molding in a mold maintained at a certain temperature using the general vacuum forming machine, thereby a molded article can be molded.

(5) In laminate molding, a laminate molded article can be obtained by a method of laminating the film or sheet obtained by the above extrusion molding method (1) with other substrate by an adhesive or heat, an extrusion lamination method of directly extruding a molten resin from T die on a substrate such as papers, metals or plastics by the same method as the above extrusion molding method (1), a co-extrusion method of melting each of the resin composition of the invention and the like with a separate extruder, respectively, flowing together at die heads, and simultaneously extruding, a co-extrusion lamination method combining those, and the like.

(6) In tape yarn molding, the film or sheet molded by the same method as the above extrusion molding (1) is slit into a specific width, and uniaxially heat stretched in a temperature range of from 60 to 140° C., and as the case may be, further heat fixed in a temperature range of from 80 to 160° C., thereby a molded article can be molded.

(7) In yarn molding, a yarn can be obtained by a melt spinning method of melting at a temperature of from 150 to 240° C. using an extruder, and discharging from a spinning nozzle. If desired, a yarn can be formed by uniaxially heat stretching in a temperature range of from 60 to 100° C., and as the case may be, further heat fixed in a temperature range of from 80 to 140° C.

(8) In non-woven molding, a molded article can be formed by a span bond method or a melt blown method. In the spun bond method, a non-woven fabric can be obtained by melt spinning through porous spinning nozzles in the same manner as in the above yarn molding (7), stretching using an air sucker arranged at the lower part of the spinning nozzle to form a web, accumulating on a trapping face, press bonding and heat welding this by an emboss roll and a smoothing roll. In the melt blown method, a non-woven fabric can be obtained by that a molten resin discharged through porous spinning nozzles is contacted with a high speed heated gas blown from a heated gas outlet to form fine fibers, and accumulating on a moving support.

By the resin composition (D) containing the aliphatic polyester resin (A), the polyolefin resin (B) and the modified polyolefin resin (C) according to the invention, a molded article having excellent heat resistance is provided than the resin composition in which only the aliphatic polyester resin (A) and the polyolefin resin (B) are merely mixed. The molded article has a softening temperature of 60° C. or higher, preferably 65° C. or higher, and more preferably 70° C. or higher, and can be applied to the field that was practically insufficient by the aliphatic polyester resin (A), particularly the conventional polylactic acid.

Further, by the resin composition (D) containing the aliphatic polyester resin (A), the polyolefin resin (B) and the modified polyolefin resin (C) according to the invention, a molded article having excellent impact resistance is provided than the resin composition in which only the aliphatic polyester resin (A) and the polyolefin resin (B) are merely mixed. The molded article has Izod impact strength of 100 J/m or higher, and preferably 130 J/m or higher, and can be applied to the field that was practically insufficient by the aliphatic polyester resin (A), particularly the conventional polylactic acid.

Further, the molded article has a heat distortion temperature (HDT) of 60° C. or higher, preferably 65° C. or higher, and more preferably 70° C. or higher, and can be applied to the field that was practically insufficient by the aliphatic polyester resin (A), particularly the conventional polylactic acid.

[Measurement Method of Various Physical Properties]

[Intrinsic Viscosity]

In the invention, the intrinsic viscosity [η] is a value measured at 135° C. using a decalin solvent. That is, about 20 mg of pelletized pellets is dissolved in 15 ml of decalin, and specific viscosity $\eta_{sp}$ is measured in an oil bath at 135° C. 5 ml of a decalin solvent is added to the decalin solution to dilute, and thereafter specific viscosity $\eta_{sp}$ is measured in the same manner. This dilution operation is further repeated two times, and the value of $\eta_{sp}/C$ when concentration (C) is extrapolated to 0 is determined as an intrinsic viscosity.

[Softening Point]

In the invention, the measurement method of the softening point means that using TMA5200 (a product of Seiko Instruments Inc.), a load of 50 g/cm$^2$ is applied using an indenter having a diameter of 1 mm, it is conducted under a nitrogen stream at a temperature rising condition of 2° C./min, penetration temperature is read, and it is used as a distortion temperature (JIS K7196).

[Izod Impact Strength]

In the invention, the Izod impact strength means a notched Izod impact strength measured at 23° C. according to ASTM D256.

[Melt Flow Rate (MFR)]

In the invention, the melt flow rate (MFR) is measured as follows. That is, an orifice satisfying the size prescribed in JI-S K7210 is fitted in an automatic MFR measuring instrument, a product of Tester Sangyo Co., produced according to JIS K7210, and temperature of a barrel (part in which a sample is placed) is elevated to 190° C. or 230° C., and is held. A sample is placed in the barrel, and preheated for 6 minutes. After preheating, a load of 2.16 Kg is applied to extrude the sample, and weight of the sample extruded per 10 minutes is calculated, and is taken as MFR.

[Weight Average Molecular Weight (Mw) and Number Average Molecular Weight (Mn)]

It was measured using GPC-150C, a product of Waters Co., as follows. Separation columns are TSKgel GMH6-HT and TSKgel GMH6-HTL, and the column size each is an inner diameter of 7.5 mm and a length of 600 mm, and column temperature is 140° C. As a mobile phase, o-dichlorobenzene (Wako Pure Chemicals Industries, Ltd.) and 0.025% by weight of BHT (Takeda Pharmaceutical Company Limited) as an antioxidant were used, it was moved in 1.0 ml/min, a sample concentration was 0.1% by weight, a sample injection amount was 500 µl, and a differential refractometer was used as a detector. Regarding the standard polystyrene, products of Tosoh Corporation were used for molecular weights of Mw<1,000 and Mw>4×10$^6$, and a product of Pressure Chemical Co. was used for 1,000≦Mw≦4×10$^6$. Molecular weight is a value obtained by making universal correction and converting into a polyethylene.

[Heat Distortion Temperature (HDT)]

In the invention, the heat distortion temperature (HDT) is a temperature at which distortion amount of a test piece reached 0.254 mm under the conditions of a temperature rising rate of 2° C./min and a test stress of 0.451 MPa using an edgewise test piece having a length of 128 mm, a width of 12.8 mm and a thickness of 3.2 mm using a heat distortion tester HDA manufactured by Yasuda Seiki Co., according to ASTM D647.

The molded article obtained from the resin composition (D) containing the aliphatic polyester resin (A), the polyolefin resin (B) and the modified polyolefin resin (C) according to the invention is good in dispersibility of a resin, and is excellent in property balance of strength, transparency and the like, and stability, as compared with the molded article comprising the conventional composition of the aliphatic polyester resin (A) and the polyolefin resin (B).

[Use of Resin Composition (D)]

The resin composition (D) of the invention can be molded by the above-described various processing methods, and can suitably be used in various uses without particular limitation. Further, those molded articles can be utilized in various uses such as automobile parts, home electric appliance material parts, electric and electronic parts, building components, civil engineering members, agricultural materials, commodities, various films, gas permeable films or sheets, foamed products suitable in general industry uses and recreation uses, yarns, textiles, medical or sanitary materials, and the like. Preferably, it can be utilized in automobile material parts, home electric appliance material parts, and electric and electronic parts, requiring heat resistance and impact resistance. Specifically, development into parts conventionally using resin parts, such as front doors and wheel caps, in the automobile part material use; development into package parts of products such as personal computers, headphone stereo and mobile phones, in home electric appliance material part uses; development into reflective material films and sheets and polarizing films and sheets in the electric and electronic parts; and the like are exemplified.

EXAMPLE

The invention is further specifically described below based on the Examples, but the invention is not limited to those Examples.

Production Example 1

Synthesis of Modified Polypropylene Resin (PP-HEMA) on which 2-Hydroxyethyl Methacrylate (HEMA) is Graft Reacted 100 parts by weight of a propylene homopolymer powder having a melt flow rate (MFR: 230° C., 2,160 g) of 0.02 g/10 min, an intrinsic viscosity [η] measured in 135° C. decalin of 10.5 dl/g, and an accumulated pore volume of 0.25 cc/g, 3 parts by weight of 2-hydroxyethyl methacrylate (HEMA) and 3 parts by weight of t-butyl peroxybenzoate (PBZ: a product of JOF Corporation) were dry blended with a Henschel mixer, and thereafter melt modified at 210° C. using a two screw kneading machine (Technobell, ZSK-30) to obtain a modified polyprolylene resin (hereinafter, PP-HEMA) pellets. Number average molecular weight (Mn) by GPC measurement of this modified polypropylene resin was 31,000. MFR was 450 g/10 min, [η] was 0.80 dl/g, and HEMA graft amount measured with NMR after purification removing unreacted HEMA was 1.7% by weight.

Production Example 2

Synthesis of Polypropylene (PP—OH) Having Hydroxyl Group at Terminal

Polypropylene ([η]=7.6) manufactured by Mitsui Chemicals, Inc. was subjected to thermal decomposition treatment at 360° C. under nitrogen atmosphere using a plastmill. Number average molecular weight (Mn) of the polymer obtained by the treatment was 27,600. It was confirmed from IR analysis that 0.74 of vinylidene group is present per one polymer chain.

To a glass reactor having an inner volume of 1,000 ml equipped with a stirrer, 800 ml of decane and the above-obtained olefin polymer having unsaturated bond at the terminal (25.0 g) were added, sufficiently substituted with nitrogen, and elevated to 140° C. to dissolve the olefin polymer. Thereafter, aluminum diisobutyl hydride (9 mmol) was added, and the mixture was treated at 140° C. under nitrogen atmosphere for 6 hours. The solution was cooled to 100° C., and epichlorohydrin (4.5 ml) was added to the reactor to contact at 100° C. for 1 hour. The reaction solution was poured in a methanol (1.5 L)/acetone (1.5 L) mixed solution containing 30 ml of 1N hydrochloric acid. After stirring at room temperature for 30 minutes, a solid component was recovered by filtration. It was dried at 80° C. for 10 hours under reduced pressure to obtain 24.8 g of a white powder.

It was confirmed from the result of NMR analysis that signal derived from an unsaturated bond is not detected, and hydroxyl group is present on the polymer terminal. 67% of one terminal of the polymer was hydroxyl group.

Production Example 3

Synthesis of Polylactic Acid (HEMA-PLA) Having Double Bond at Terminal

After adding 0.65 g (5.0 mmol) of 2-hydroxyethyl methacrylate, 50.4 g (350 mmol) of L-lactide, 22.0 mg (0.22 mmol) of hydroquinone, and 2.5 mg (0.5 g of 0.5 wt % xylene solution was added) of tin octanoate, reaction was conducted at 170° C./1 atm for 4 hours under nitrogen atmosphere, and thereafter, the reaction mass was cooled. After dissolving the reaction product in 250 ml of chloroform, it was precipitated in methanol while stirring, and residual L-lactide was removed by well stirring. Suction filtration was conducted. Rinse washing was conducted with methanol, and drying was conducted at 60° C. and 2 kPa for 24 hours to obtain 50.1 g of polylactic acid (HEMA-PLA) having a number average molecular weight (Mn) of 9,150 and having a double bond at the terminal.

Production Example 4

Synthesis of Terminal Esterified Polyethylene Having Radical Polymerization Initiating Terminal To 2 L glass polymerization vessel equipped with Dimroth condenser sufficiently substituted with nitrogen, 1,700 mL of toluene was placed. While passing through nitrogen gas (30 L/h), temperature was elevated to 45° C. with stirring (600 rpm). Next, 13.1 ml of triethyl aluminum and 5.4 ml of allyl alcohol were added, and maintained at 50° C. After 5 minutes, a deep green solution obtained by contacting 33.7 mg of a metallocene compound represented by the chemical formula (1) prepared in a separate 20 ml Schrenck bottle substituted with nitrogen and methyl aluminoxane (2.22 ml of a toluene solution having Al concentration of 1.41 mol/L) was added, nitrogen gas was rapidly changed to 10 L/h of ethylene gas, and polymerization reaction was conducted at 50° C. for 150 minutes with a stirring speed of 600 rpm. Thereafter, 20 mL of isobutyl alcohol was added to stop the polymerization reaction. The polymerization reaction solution was poured in 2 L of methanol containing 30 ml of 1N hydrochloric acid, and stirred overnight. Filtration was conducted with a glass filter, and a white polymer obtained was dried at 80° C. for 10 hours under reduced pressure (1.3 kPa) to obtain 25.7 g of a polyethylene having allyl alcohol introduced in the terminal. Weight average molecular weight (Mw) of the obtained polyethylene was 29,500 g/mol, and number average molecular weight (Mn) was 11,200 g/mol. It was confirmed from the result of NMR analysis that 0.92 hydroxyl group derived from allyl alcohol is present per one polymer chain.

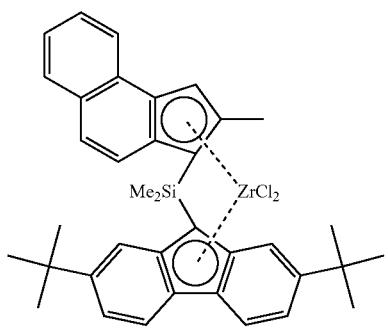

(1)

20 g of the terminal hydroxyl group-containing polyethylene obtained above was placed in a 1 L two-necked eggplant flask deaerated and substituted with nitrogen, 400 ml of dry toluene, 3.9 ml of triethylamine, and 2.8 ml of 2-bromoisobutyryl bromide were added respectively, elevated to 80° C., and stirred for 2 hours under heating. The reaction solution was poured in 2 L of methanol, and a polymer precipitated was filtered with a glass filter. In this case, the polymer on the glass filter was successively washed with 100 ml of methanol three times, 100 ml of 1N hydrochloric acid one time, and 100 ml of methanol two times. The polymer was dried under the reduced pressure conditions of 50° C. and 1.3 kPa (10 Torr) for 10 hours. As a result of $^1$H-NMR analysis, a polymer in which the terminal hydroxyl group was esterified was obtained.

Production Example 5

Synthesis of Polyethylene-Polymethyl Methacrylate Block Copolymer (C-2-1)

To 500 mL glass reactor equipped with Dimroth condenser and a stirring rod sufficiently substituted with nitrogen gas, 15.0 g of the terminal esterified polymer produced in Production Example 4, 45.3 ml of methyl methacrylate (MMA) and 50 ml of o-xylene were placed, and elevated to 80° C. while slowly stirring. A uniform solution obtained by mixing 167 mg of copper (I) bromide, 1.1 ml of 2M N,N,N',N'',N''-pentamethyldiethyl triamine/o-xylene solution, and 5.0 ml of o-xylene in a separate Schrenck bottle substituted with nitrogen was introduced in a polymerization vessel, temperature was elevated to 120° C., and polymerization of MMA was initiated while stirring at 450 rpm. After 4.5 hours, because viscosity increased, 200 ml of toluene was additionally added, and stirring was conducted at 100° C. for 1 hour. Thereafter, the polymerization reaction solution was poured in 2.0 L of methanol to precipitate a polymer. The precipitated polymer was filtered off with a glass filter, and dried under the reduced pressure conditions of 80° C. and 2.0 kPa (15 Torr) for 10 hours.

From the result of NMR analysis, a polyethylene-polymethyl methacrylate block copolymer (C-2-1) having 65.3 wt % of a methyl methacrylate polymer was obtained.

Production Example 6

Synthesis of Polyethylene-Polymethyl Methacrylate Block Copolymer (C-2-2)

To 500 mL glass reactor equipped with Dimroth condenser and a stirring rod sufficiently substituted with nitrogen gas, 77.0 g of the terminal esterified polymer synthesized in the method shown in Production Example 4, 86.9 ml of methyl methacrylate (MMA) and 324 ml of o-xylene were placed, and elevated to 80° C. while gradually stirring. A uniform solution obtained by mixing 855 mg of copper (I) bromide, 5.4 ml of 2M N,N,N',N'',N''-pentamethyldiethyl triamine/o-xylene solution, and 5.0 ml of o-xylene in a separate Schrenck bottle substituted with nitrogen was introduced in a polymerization vessel, temperature was elevated to 120° C., and polymerization reaction of MMA was initiated while stirring at 450 rpm. After 3.5 hours, 200 ml of toluene was additionally added, and stirring was conducted at 100° C. for 1 hour. Thereafter, the polymerization reaction solution was poured in 2.0 L of methanol to precipitate a polymer. The precipitated polymer was filtered off with a glass filter, and dried under the reduced pressure conditions of 80° C. and 2.0 kPa (15 Torr) for 10 hours.

From the result of NMR analysis, a polyethylene-polymethyl methacrylate block copolymer (C-2-2) having 39.1 wt % of a methyl methacrylate polymer was obtained.

Production Example 7

Synthesis of Terminal Esterified Polypropylene Having Radical Polymerization Initiating Terminal 57.4 g of the terminal hydroxyl group-containing polypropylene obtained in Production Example 2 was placed in a 1 L two-necked eggplant flask deaerated and substituted with nitrogen, 500 ml of dry toluene, 4.1 ml of triethylamine, and 3.1 ml of 2-bromoisobutyryl bromide were added respectively, temperature was elevated to 80° C., and stirring was conducted for 3 hours under heating.

After adding 20 ml of methanol to a slurry-like reaction mixed solution, and cooling to room temperature, a polymer was filtered with a glass filter. In this case, the polymer on the glass filter was successively washed with 100 ml of methanol two times, 100 ml of 1N hydrochloric acid two times, 100 ml of pure water two times, and 100 ml of methanol two times. The polymer was dried under the reduced pressure conditions of 50° C. and 1.3 kPa (10 Torr) for 10 hours. As a result of $^1$H-NMR analysis, a polymer in which the terminal hydroxyl group was esterified was obtained.

Production Example 8

Synthesis of Polypropylene-Polymethyl Methacrylate Block Copolymer (C-3-1)

A 500 mL glass reactor equipped with Dimroth condenser and a stirring rod was sufficiently substituted with nitrogen gas, 28.8 g of the above terminal esterified polypropylene, 30.3 ml of methyl methacrylate (MMA) and 98.2 ml of o-xylene were placed, and temperature was elevated to 120° C. while gradually stirring. A uniform solution obtained by mixing 100 mg of copper (I) bromide, 0.63 ml of 2M N,N,N',N",N"-pentamethyldiethyl triamine/o-xylene solution, and 5.0 ml of o-xylene in a separate Schrenck bottle substituted with nitrogen was introduced in a polymerization vessel, temperature was elevated to 120° C., and polymerization reaction of MMA was initiated while stirring at 350 rpm. After 7.0 hours, 150 ml of toluene was added to dilute, 20 ml of isobutyl alcohol was added, and temperature was cooled to room temperature. The polymerization reaction solution was poured in 1.5 L of methanol to precipitate a polymer. The precipitated polymer was filtered off with a glass filter, washed with 20 ml of methanol two times, and then dried under the reduced pressure conditions of 80° C. and 2.0 kPa (15 Torr) for 10 hours.

From the result of NMR analysis, a polypropylene-polymethyl methacrylate block copolymer (C-3-1) containing about 33 wt % of unreacted homopolypropylene and having 36.3 wt % of a methyl methacrylate segment was obtained.

Production Example 9

Synthesis of Polypropylene-Polymethyl Methacryalte Block Copolymer (C-3-2)

A 500 mL glass-made reactor equipped with Dimroth condenser and a stirring rod was sufficiently substituted with nitrogen gas, 17.3 g of the terminal esterified polypropylene obtained in the same method as described in Production Example 7, 48.5 ml of methyl methacrylate (MMA) and 58.7 ml of o-xylene were placed, and temperature was elevated to 120° C. while gradually stirring. A uniform solution obtained by mixing 60 mg of copper (I) bromide, 0.38 ml of 2M N,N,N',N",N"-pentamethyldiethyl triamine/o-xylene solution, and 5.0 ml of o-xylene in a separate Schrenck bottle substituted with nitrogen was introduced in a polymerization vessel, and polymerization reaction of MMA was initiated while stirring at 120° C. and 350 rpm. After 7.0 hours, 150 ml of toluene was added to dilute, 20 ml of isobutyl alcohol was added, and temperature was cooled to room temperature. The polymerization reaction solution was poured in 1.5 L of methanol to precipitate a polymer. The precipitated polymer was filtered off with a glass filter, and after washing with 20 ml of methanol two times, dried under the reduced pressure conditions of 80° C. and 2.0 kPa (15 Torr) for 10 hours.

From the result of NMR analysis, a polypropylene-polymethyl methacrylate block copolymer (C-3-2) containing 20 wt % of unreacted homopolypropylene and having 59.9 wt % of a methyl methacrylate segment was obtained.

Example 1

Synthesis of HEMA-PP/PLA Copolymer (C-1-1)

10.0 g of HEMA-PP obtained in Production Example 1 and 40.0 g of a mixed xylene previously dehydrated using a molecular sieve 3A were stirred in a 100 ml separable flask under the condition of 130° C./100 kPa (1 atm) while flowing nitrogen, to dissolve HEMA-PP. After cooling, 10.0 g of lactide and 0.005 g of tin octanoate (1.0 g of 0.5 wt % xylene solution was added) were added, and reaction was conducted at 130° C./100 kPa (1 atm) for 4 hours under nitrogen atmosphere. After completion of the reaction, 50 g of dehydrated mixed xylene was added, and stirring was conducted until being uniform, followed by gradual cooling, thereby crystallizing a polymer. The crystallized mass was added to 400 g of methanol, and after well stirring, suction filtration was conducted. The filter cake was again added to 400 g of methanol, and after stirring, suction filtration was conducted. During the suction filtration, 400 g of methanol was further poured from the above by dividing into several portions to rinse washing the filter cake. After recovering the filter cake, it was dried in a blast dryer at 80° C. for 24 hours. Weight of the polymer obtained was 18.8 g.

Example 2

Synthesis of HEMA-PP/PLA Copolymer (C-1-2)

10.0 g of HEMA-PP obtained in Production Example 1 and 40.0 g of a mixed xylene previously dehydrated using a molecular sieve 3A were stirred in a 100 ml separable flask under the condition of 130° C./100 kPa (1 atm) while flowing nitrogen, to dissolve HEMA-PP. After cooling, 30.0 g of lactide and 0.015 g of tin octanoate (3.0 g of 0.5 wt % xylene solution was added) were added, and reaction was conducted at 130° C./100 kPa (1 atm) for 4 hours under nitrogen atmosphere. After completion of the reaction, 50 g of dehydrated mixed xylene was added, and stirring was conducted until being uniform, followed by gradual cooling, thereby crystallizing a polymer. The crystallized mass was added to 400 g of methanol, and after well stirring, suction filtration was conducted. The filter cake was again added to 400 g of methanol, and after stirring, suction filtration was conducted. During the suction filtration, 400 g of methanol was further poured from the above by dividing into several portions to rinse washing the filter cake. After recovering the filter cake, it was dried in a blast dryer at 80° C. for 24 hours. Weight of the polymer obtained was 34.0 g.

Example 3

Synthesis of HEMA-PP/PLA Copolymer (C-1-3)

10.0 g of HEMA-PP obtained in Production Example 1 and 60.0 g of a mixed xylene previously dehydrated using a molecular sieve 3A were stirred in a 200 ml separable flask under the condition of 130° C./100 kPa (1 atm) while flowing nitrogen, to dissolve HEMA-PP. After cooling, 50.0 g of lactide and 0.025 g of tin octanoate (5.0 g of 0.5 wt % xylene solution was added) were added, and reaction was conducted at 130° C./100 kPa (1 atm) for 4 hours under nitrogen atmosphere. After completion of the reaction, 70 g of dehydrated mixed xylene was added, and stirring was conducted until being uniform, followed by gradual cooling, thereby crystallizing a polymer. The crystallized mass was added to 500 g of methanol, and after well stirring, suction filtration was conducted. The filter cake was again added to 500 g of methanol, and after stirring, suction filtration was conducted. During the suction filtration, 500 g of methanol was further poured from the above by dividing into several portions to rinse washing the filter cake. After recovering the filter cake, it was dried in a blast dryer at 80° C. for 24 hours. Weight of the polymer obtained was 53.8 g.

Example 4

Synthesis of HEMA-PP/PLA Copolymer (C-1-4)

36.0 g of HEMA-PLA obtained in Production Example 3, 36.0 g of a propylene homopolymer powder having a melt flow rate (MFR; 230° C., 2160 g) of 0.02 g/10 min, an intrinsic viscosity [η] measured in 135° C. decalin of 10.5 dl/g and an accumulated pore volume of 0.25 cc/g, and 0.72 g of t-butylperoxybenzoate (PBZ: a product of NOF Corporation) were melt mixed using a laboplast mill manufactured by Toyo Seiki Co., under the conditions of a temperature of 190° C., a time of 5 minutes and a number of revolution of 50 rpm to obtain HEMA-PP/PLA copolymer (C-1-4). Number average molecular weight (Mn) by GPC measurement of this copolymer (C-1-4) was 27,000.

Example 5

Synthesis of PP—OH/PLA Copolymer (C-1-5)

20.0 g of PP—OH obtained in Production Example 2 and 80.0 g of a mixed xylene previously dehydrated using a molecular sieve 3A were stirred in a 200 ml separable flask under the condition of 130° C./100 kPa (1 atm) while flowing nitrogen, to dissolve PP—OH. After cooling, 8.0 g of lactide and 0.004 g of tin octanoate (0.8 g of 0.5 wt % xylene solution was added) were added, and reaction was conducted at 130° C./100 kPa (1 atm) for 4 hours under nitrogen atmosphere. After completion of the reaction, 80 g of dehydrated mixed xylene was added, and stirring was conducted until being uniform, followed by gradual cooling, thereby crystallizing a polymer. The crystallized mass was added to 600 g of methanol, and after well stirring, suction filtration was conducted. The filter cake was again added to 600 g of methanol, and after stirring, suction filtration was conducted. During the suction filtration, 600 g of methanol was further poured from the above by dividing into several portions to rinse washing the filter cake. After recovering the filter cake, it was dried in a blast dryer at 80° C. for 24 hours. Weight of the polymer obtained was 26.4 g.

Example 6

Synthesis of PP—OH/PLA Copolymer (C-1-6)

10.0 g of PP—OH obtained in Production Example 2 and 40.0 g of a mixed xylene previously dehydrated using a molecular sieve 3A were stirred in a 100 ml separable flask under the condition of 130° C./100 kPa (1 atm) while flowing nitrogen, to dissolve PP—OH. After cooling, 10.0 g of lactide and 0.005 g of tin octanoate (1.0 g of 0.5 wt % xylene solution was added) were added, and reaction was conducted at 130° C./100 kPa (1 atm) for 4 hours under nitrogen atmosphere. After completion of the reaction, 50 g of dehydrated mixed xylene was added, and stirring was conducted until being uniform, followed by gradual cooling, thereby crystallizing a polymer. The crystallized mass was added to 400 g of methanol, and after well stirring, suction filtration was conducted. The filter cake was again added to 400 g of methanol, and after stirring, suction filtration was conducted. During the suction filtration, 400 g of methanol was further poured from the above by dividing into several portions to rinse washing the filter cake. After recovering the filter cake, it was dried in a blast dryer at 80° C. for 24 hours. Weight of the polymer obtained was 18.4 g.

Example 7

Synthesis of PP—OH/PLA Copolymer (C-1-7)

10.0 g of PP—OH obtained in Production Example 2 and 40.0 g of a mixed xylene previously dehydrated using a molecular sieve 3A were stirred in a 100 ml separable flask under the condition of 130° C./100 kPa (1 atm) while flowing nitrogen, to dissolve PP—OH. After cooling, 20.0 g of lactide and 0.010 g of tin octanoate (2.0 g of 0.5 wt % xylene solution was added) were added, and reaction was conducted at 130° C./100 kPa (1 atm) for 4 hours under nitrogen atmosphere. After completion of the reaction, 50 g of dehydrated mixed xylene was added, and stirring was conducted until being uniform, followed by gradual cooling, thereby crystallizing a polymer. The crystallized mass was added to 400 g of methanol, and after well stirring, suction filtration was conducted. The filter cake was again added to 400 g of methanol, and after stirring, suction filtration was conducted. During the suction filtration, 400 g of methanol was further poured from the above by dividing into several portions to rinse washing the filter cake. After recovering the filter cake, it was dried in a blast dryer at 80° C. for 24 hours. Weight of the polymer obtained was 27.9 g.

Example 8

50 parts by weight of a homopolypropylene manufactured by Mitsui Chemicals, Inc. (registered trade mark MITSUI POLYPRO; MFR at 230° C.: 24.9 g/10 min, melting point: 161° C., weight average molecular weight: 222,000), 50 parts by weight of a polylactic acid manufactured by Mitsui Chemicals, Inc. (registered trade mark LACEA Grade H100), and 5 parts by weight of the copolymer (C-1-1) obtained in Example 1 were melt mixed under conditions of a temperature of 200° C., a time of 5 minutes and a number of revolution of 100 rpm using Laboplast mill manufactured by Toyo Seiki Kogyo Co. A resin composition (D-1) obtained was uniform visually. A part was picked up, and its cross-section was observed with a transmission electron microscope. As a result, a polylactic acid phase was an island phase, and a polypropylene was a sea phase. A size of the island phase was about 5 μm or less.

Comparative Example 1

50 parts by weight of a polypropylene manufactured by Mitsui Chemicals, Inc. (registered trade mark MITSUI POLYPRO; MFR at 230° C.: 24.9 g/10 min, weight average molecular weight: 222,000), and 50 parts by weight of a polylactic acid manufactured by Mitsui Chemicals, Inc. (registered trade mark LACEA Grade H100) were melt mixed in the same manner as in Example 8, except for not using the copolymer (C-1-1). As a result of observing a cut piece with an optical microscope, a polylactic acid phase was an island phase, and a polypropylene phase was a sea phase. A size of the island phase was about 20 μm or more.

Example 9

The polyolefin resin/polylactic acid-based resin composition (D-1) obtained in Example 8 was press molded under the conditions of a temperature of 200° C., a pressure of 10 MPa (100 kg/cm$^2$) and a pressurizing time of 5 minutes to obtain a square press piece having a thickness of 1 mm and one side of 40 mm. The press piece obtained was cut into a square of 5 mm×5 mm to obtain a test piece. Heat resistance test was conducted according to the method described in JIS K7196. Specifically, the test was conducted using TMA 5200 (a product of Seiko Instruments Inc), and applying a load of 50 gf/cm$^2$ using an indenter having a diameter of 1 mm, under nitrogen stream and a temperature rising condition of 2° C./min, and a penetration temperature was read, and it was used as a distortion temperature. Softening temperature of this test piece was 70° C.

Comparative Example 2

A polylactic acid (manufactured by Mitsui Chemicals, Inc.; registered trade name LACEA, Grade H100) was molded in the same manner as in Example 9, and as a result of measuring a softening point, it was 55° C.

Comparative Example 3

A resin composition obtained by melt mixing 15 parts by weight of a syndiotactic polypropylene (weight average molecular weight 250,000) with a polylactic acid (manufactured by Mitsui Chemicals, Inc.; registered trade name LACEA, Grade H100) was molded in the same manner as in Example 9, and as a result of measuring a softening point, it was 57° C.

Example 10

85% by weight, that is, 89.5 parts by weight, of a polylactic acid manufactured by Mitsui Chemicals, Inc. (registered trade name LACEA, Grade H100), 10% by weight, that is, 10.5 parts by weight, of an ethylene butene copolymer manufactured by Mitsui Chemicals, Inc. (registered trade mark TAFMER, Grade A4050), and 5% by weight, that is, 5.3 parts by weight, of the polyethylene-polymethyl methacrylate block copolymer (C-2-1) were mixed, and kneaded under the conditions of a temperature of 200° C., a time of 5 minutes and a number of revolutions of 100 rpm using Laboplast mill manufactured by Toyo Seiki Kogyo Co. The resin composition obtained was heated at a temperature of 200° C., pressed under the conditions of a pressure of 10 MPa (100 kg/cm$^2$) and a pressuring time of 5 minutes, and then quenched to obtain a molded article (E-2) having a thickness of 3 mm, a width of 6 mm and a length of 12.6 mm. Notch was formed on the molded article (E-2) obtained. Izod impact strength measured according to ASTMD256 was 378 J/m, and it was semi-ruptured Example 11

A molded article (E-3) was obtained by conducting mixing and molding in the same manner as in Example 10, except for using 85% by weight, that is, 89.5 parts by weight, of a polylactic acid manufactured by Mitsui Chemicals, Inc. (registered trade name LACEA, Grade H100), 10% by weight, that is, 10.5 parts by weight, of an ethylene butene copolymer manufactured by Mitsui Chemicals, Inc. (registered trade mark TAFMER, Grade A4050), and 5% by weight, that is, 5.3 parts by weight, of the above polyethylene-polymethyl methacrylate block copolymer (C-2-2). Izod impact strength (23° C., notched) of the molded article (E-3) obtained measured according to ASTMD256 was 382 J/m, and it was semi-ruptured.

Comparative Example 4

A molded article was obtained by conducting melting and molding in the same manner as in Example 11, except for using 100 parts by weight of a polylactic acid manufactured by Mitsui Chemicals, Inc. (registered trade name LACEA, Grade H100). Notch was formed on the molded article obtained. Izod impact strength (23° C., notched) measured according to ASTMD256 was 33 J/m.

Comparative Example 5

A molded article was obtained by conducting mixing and molding in the same manner as in Example 11, except for using 85 parts by weight of a polylactic acid manufactured by Mitsui Chemicals, Inc. (registered trade name LACEA, Grade H100) and 15 parts by weight of an ethylene butene copolymer manufactured by Mitsui Chemicals, Inc. (registered trade mark TAFMER, Grade A4050). Notch was formed on the molded article obtained. Izod impact strength (23° C., notched) measured according to ASTM D256 was 39 J/m.

Example 12

50 parts by weight of a polylactic acid manufactured by Mitsui Chemicals, Inc. (registered trade name LACEA, Grade H100), 50 parts by weight of a polypropylene manufactured by Mitsui Chemicals, Inc. (registered trade mark MITSUI POLYPRO; MFR at 230° C.: 24.9 g/10 min, melting point: 161° C., weight average molecular weight: 222,000), and 5 parts by weight of the above polypropylene-polymethyl methacrylate block copolymer (C-3-1) were mixed, and kneaded under the conditions of a temperature of 200° C., a time of 5 minutes and a number of revolutions of 100 rpm using Laboplast mill manufactured by Toyo Seiki Kogyo Co. The resin composition obtained was visually uniform. A part was picked up, and its cross-section was observed with a transmission electron microscope. As a result, a polylactic acid phase was an island phase, and a polypropylene was a sea phase. A size of the island phase was about 5 μm or less.

The resin composition obtained above was press molded under the conditions of a temperature of 200° C., a pressure of 10 MPa (100 kg/cm$^2$) and a pressurizing time of 5 minutes to obtain a square press piece having a thickness of 1 mm and one side of 40 mm. The press piece obtained was cut into a square of 5 mm×5 mm to obtain a test piece. Heat resistance test was conducted according to the method described in JIS K7196. Specifically, the test was conducted using TMA 5200 (a product of Seiko Instruments Inc), and applying a load of 50 gf/cm$^2$ using an indenter having a diameter of 1 mm, under nitrogen stream and a temperature rising condition of 2° C./min, and a penetration temperature was read, and it was used as a softening temperature. Softening temperature of this test piece was 72° C.

Example 13

A resin composition obtained by mixing in the same manner as in Example 12, except for using 50 parts by weight of a polylactic acid manufactured by Mitsui Chemicals, Inc. (registered trade name LACEA, Grade H100), 50 parts by weight of a polypropylene manufactured by Mitsui Chemicals, Inc. (registered trade mark MITSUI POLYPRO; MFR at 230° C.: 24.9 g/10 min, melting point: 161° C., weight average molecular weight: 222,000), and 5 parts by weight of the above polypropylene-polymethyl methacrylate block copolymer (C-3-2) was visually uniform. A part was picked up, and its cross-section was observed with a transmission electron microscope. As a result, a polylactic acid phase was an island phase, and a polypropylene was a sea phase. A size of the island phase was about 5 µm or less.

Using the resin composition obtained above, a softening temperature was measured according to the method described in JIS K7196 in the same manner as in Example 9. The softening temperature of this test piece was 67° C.

Example 14

50 parts by weight of a polylactic acid manufactured by Mitsui Chemicals, Inc. (registered trade name LACEA, Grade H100), 50 parts by weight of a polypropylene manufactured by Mitsui Chemicals, Inc. (registered trade mark MITSUI POLYPRO; MFR at 230° C.: 24.9 g/10 min, melting point: 161° C., weight average molecular weight: 222,000), 5 parts by weight of the above copolymer (C-1-3), 10 parts by weight of talc (a product of Fuji Talc Kogyo Co.; average particle diameter: 4.2 µm, apparent density: 0.13 g/ml, whiteness: 98.5%) as an inorganic filler, and 10 parts by weight of a styrene-ethylene-butylene-styrene series SEBS rubber (MFR measured at 230° C.: 4.5 g/10 min, specific gravity: 0.89, styrene content: 18 wt %) as a rubber were uniformly blended with a mixer, melt kneaded using twin screw extruder TEM35BS (a product of Toshiba Machine Co.) at a cylinder temperature of 180° C., and then pelletized to obtain a thermoplastic resin composition (D). Next, it was injection molded using injection molding machine Ti-80G2 (a product of Toyo Machinery & Metal Co., Ltd.) under the conditions of a cylinder preset temperature of from 170 to 200° C., a mold temperature of 80° C., an injection and dwelling time of 10 seconds, and a cooling time of 30 seconds to obtain a 3.2 mm thick ASTM test piece. Heat distortion temperature of the obtained test piece under 0.45 MPa load was 63° C., and Izod impact strength under 23° C. atmosphere was 101 J/m. Further, melt kneaded pellets were molded in the same manner as in Example 9, and the softening temperature was measured according to the method described in JIS K7196. The softening temperature of this test piece was 167.3° C.

Example 15

50 parts by weight of a polylactic acid manufactured by Mitsui Chemicals, Inc. (registered trade name LACEA, Grade H100), 50 parts by weight of a block polypropylene manufactured by Mitsui Chemicals, Inc. (registered trade mark MITSUI POLYPRO; MFR measured at 230° C.: 25 g/10 min, specific gravity: 0.91, amount of component soluble in normal decane: 8%), 10 parts by weight of SEBS (a product of Asahi Kasei Corporation, TUFTEC; MFR at a temperature of 230° C. under 2.16 kgf load: 4.5 g/10 min, styrene/ethylene-butene ratio:18/82, specific gravity: 0.89), 10 parts by weight of talc (a product of Fuji Talc Kogyo Co.; average particle diameter: 4.2 µm, apparent density: 0.13 g/ml, whiteness: 98.5%), and 5 parts by weight of the copolymer (C-1-3) were uniformly blended with a mixer, melt kneaded using twin screw extruder TEM35BS (a product of Toshiba Machine Co.) at a cylinder temperature of 180° C., and then pelletized to obtain a thermoplastic resin composition (D). Next, it was injection molded using injection molding machine IS-55 (a product of Toshiba Machine Co.) under the conditions of a cylinder preset temperature of 210° C., a mold temperature of 80° C., an injection and dwelling time of 10 seconds, and a cooling time of 30 seconds to obtain a 3.2 mm thick ASTM test piece. Heat distortion temperature of the obtained test piece under 0.45 MPa load was 77° C., and Izod impact strength under 23° C. atmosphere was 110 J/m. Further, melt kneaded pellets were molded in the same manner as in Example 9, and the softening temperature was measured according to the method described in JIS K7196. The softening temperature of this test piece was 164.9° C.

Example 16

50 parts by weight of a polylactic acid manufactured by Mitsui Chemicals, Inc. (registered trade name LACEA, Grade H100), 50 parts by weight of a polypropylene manufactured by Mitsui Chemicals, Inc. (registered trade mark MITSUI POLYPRO; MFR measured at 230° C.: 13 g/10 min, melting point: 165° C., weight average molecular weight: 339,000), 5 parts by weight of the above copolymer (C-1-3), 10 parts by weight of talc (a product of Fuji Talc Kogyo Co.; average particle diameter: 4.2 µm, apparent density: 0.13 g/ml, whiteness: 98.5%) as an inorganic filler, and 10 parts by weight of a styrene-ethylene-butylene-styrene series SEBS rubber (MFR measured at 230° C.: 4.5 g/10 min, specific gravity: 0.89, styrene content: 18 wt %) as a rubber were uniformly blended with a mixer, melt kneaded using twin screw extruder TEM35BS (a product of Toshiba Machine Co.) at a cylinder temperature of 180° C., and then pelletized to obtain a thermoplastic resin composition (D). Next, it was injection molded using injection molding machine Ti-80G2 (a product of Toyo Machinery & Metal Co., Ltd.) under the conditions of a cylinder preset temperature of from 170 to 200° C., a mold temperature of 80° C., an injection and dwelling time of 10 seconds, and a cooling time of 30 seconds to obtain a 3.2 mm thick ASTM test piece. Heat distortion temperature of the obtained test piece under 0.45 MPa load was 105° C., and Izod impact strength under 23° C. atmosphere was 103 J/m. Further, melt kneaded pellets were molded in the same manner as in Example 9, and the softening temperature was measured according to the method described in JIS K7196. The softening temperature of this test piece was 167.4° C.

Comparative Example 6

Similar to Example 16, except for not adding the copolymer (C-1-3), 50 parts by weight of a polylactic acid manufactured by Mitsui Chemicals, Inc. (registered trade name LACEA, Grade H100), 50 parts by weight of a block polypropylene manufactured by Mitsui Chemicals, Inc. (registered trade mark MITSUI POLYPRO; MFR measured at 230° C.: 25 g/10 min, specific gravity: 0.91, amount of component soluble in normal decane: 8%), 10 parts by weight of SEBS (a product of Asahi Kasei Corporation, TUFTEC; MFR at a temperature of 230° C. under 2.16 kgf load: 4.5 g/10 min, styrene/ethylene-butene ratio:18/82, specific gravity: 0.89), and 10 parts by weight of talc (a product of Fuji Talc Kogyo Co.; average particle diameter: 4.2 µm, apparent density: 0.13 g/ml, whiteness: 98.5%) were uniformly blended with a mixer, melt kneaded using twin screw extruder TEM35BS (a product of Toshiba Machine Co.) at a cylinder temperature of 200° C., and then pelletized to obtain a thermoplastic resin composition (D). Next, it was injection molded using injection molding machine IS-55 (a product of Toshiba Machine Co.) under the conditions of a cylinder preset temperature of from 170 to 210° C., a mold temperature of 30° C., an injection and dwelling time of 10 seconds, and a cooling time of 30 seconds to obtain a 3.2 mm thick ASTM test piece. Heat distortion temperature of the obtained test piece under 0.45 MPa load was 58° C., and Izod impact strength under 23° C. atmosphere was 55 J/m. Because the modified polyolefin was not added, impact strength decreased. Further, melt kneaded pellets were molded in the same manner as in Example 9, and the softening temperature was measured according to the method described in JIS K7196. The softening temperature of this test piece was 58.6° C.

Example 17

50 parts by weight of a polylactic acid manufactured by Mitsui Chemicals, Inc. (registered trade name LACEA, Grade H280), 50 parts by weight of a block polypropylene manufactured by Mitsui Chemicals, Inc. (registered trade mark MITSUI POLYPRO; MFR measured at 230° C.: 25 g/10 min, specific gravity: 0.91, amount of component soluble in normal decane: 8%), and 5 parts by weight of the above copolymer (C-1-3) were mixed, kneaded under the conditions of a temperature of 200° C., a time of 5 minutes and a number of revolutions of 100 rpm using Laboplast mill manufactured by Toyo Seiki Kogyo Co., pressed under the conditions of a pressure of 10 MPa (100 kg/cm$^2$) and a pressurizing time of 5 minutes, and then quenched to obtain a yellowish-white semitransparent sheet. Thereafter, by strongly stretching in uniaxial direction 4 times or more in area ratio at 120° C., a white glossy film was obtained. As a result of observing with a scanning electron microscope, cavity that the polylactic acid and the polypropylene peeled at the interface was less than 10 μm, and it was a sufficient film as a reflective material film.

Comparative Example 7

Similar to Example 17 except for not adding the copolymer (C-1-3), 50 parts by weight of a polylactic acid manufactured by Mitsui Chemicals, Inc. (registered trade name LACEA, Grade H280) and 50 parts by weight of a block polypropylene manufactured by Mitsui Chemicals, Inc. (registered trade mark MITSUI POLYPRO; MFR measured at 230° C.: 25 g/10 min, specific gravity: 0.91, amount of component soluble in normal decane: 8%) were mixed and kneaded under the conditions of a temperature of 200° C., a time of 5 minutes and a number of revolutions of 100 rpm using Laboplast mill manufactured by Toyo Seiki Kogyo Co., pressed under the conditions of a pressure of 10 MPa (100 kg/cm$^2$) and a pressurizing time of 5 minutes, and then quenched to obtain a yellowish-white semitransparent sheet. Thereafter, when it was strongly stretched in uniaxial direction 4 times or more in area ratio at 120° C., the film obtained was a film free from gloss. As a result of observing with a scanning electron microscope, cavity that the polylactic acid and the polypropylene peeled at the interface exceeded 50 μm, and it was an insufficient film as a reflective material film.

INDUSTRIAL APPLICABILITY

The molded article obtained from the resin composition (D) containing the aliphatic polyester resin (A), the polyolefin resin (B) and the modified polyolefin resin (C), according to the invention is excellent in heat resistance and impact resistance, and can be used as automobile materials, home electric appliance material parts, electric and electronic parts, containers, medical materials, and other various industrial materials.

The invention claimed is:

1. A modified polyolefin resin (C-1) comprising a copolymer having a structure that a propylene-based polyolefin segment (a) and a segment (b) containing a lactic acid as a constituent are bonded in a graft state through a vinyl monomer having a hydroxyl group, wherein a number average molecular weight of the propylene-based polyolefin segment (a) is from 1,000 to 100,000, a number average molecular weight of the segment (b) containing lactic acid as a constituent is from 1,000 to 200,000, and a weight composition of the propylene-based polyolefin segment (a) and the segment (b) containing lactic acid as a constituent is from 10/90 to 90/10.

2. A method of producing the modified polyolefin resin (C-1) according to claim 1, wherein a propylene-based polyolefin resin (a1) is graft-polymerized in the presence of a radical polymerization initiator (c) with a vinyl monomer (a2) having a hydroxyl group to produce a polyolefin modified with a vinyl monomer having a hydroxyl group, and successively, a monomer comprising a lactide or a lactic acid as a main component is polymerized in the presence of the polyolefin modified with a vinyl monomer having a hydroxyl group.

3. A resin composition (D) comprising from 1 to 99 parts by weight of an aliphatic polyester resin (A), from 99 to 1 parts by weight of a polyolefin resin (B) provided that the sum of (A) and (B) is 100 parts by weight and from 0.1 to 100 parts by weight of a modified polyolefin resin (C-1) according to claim 1 to the sum of 100 parts by weight of (A) and (B).

4. The resin composition (D) according to claim 3, wherein the composition comprises from 40 to 99 parts by weight of an aliphatic polyester resin (A), from 60 to 1 parts by weight of a polyolefin resin (B) provided that the sum of (A) and (B) is 100 parts by weight, and from 0.1 to 50 parts by weight of modified polyolefin resin (C-1) to the sum of 100 parts by weight of (A) and (B), and has a softening temperature of 60° C. or higher, wherein modified polyolefin resin (C-1) comprises a copolymer having a structure that a propylene-based polyolefin segment (a) and a segment (b) containing a lactic acid as a constituent are bonded in a graft state through a vinyl monomer having a hydroxyl group, wherein a number average molecular weight of the propylene-based polyolefin segment (a) is from 1,000 to 100,000, a number average molecular weight of the segment (b) containing lactic acid as a constituent is from 1,000 to 200,000, and a weight composition of the propylene-based polyolefin segment (a) and the segment (b) containing lactic acid as a constituent is from 10/90 to 90/10.

5. The resin composition (D) according to claim 3, wherein the composition comprises from 40 to 99 parts by weight of an aliphatic polyester resin (A), from 60 to 1 parts by weight of a polyolefin resin (B) provided that the sum of (A) and (B) is 100 parts by weight, and from 0.1 to 50 parts by weight of modified polyolefin resin (C-1) to the sum of 100 parts by weight of (A) and (B), and has Izod impact strength of 100 J/m or more, wherein modified polyolefin resin (C-1) comprises a copolymer having a structure that a propylene-based polyolefin segment (a) and a segment (b) containing a lactic acid as a constituent are bonded in a graft state through a vinyl monomer having a hydroxyl group, wherein a number average molecular weight of the propylene-based polyolefin segment (a) is from 1,000 to 100,000, a number average molecular weight of the segment (b) containing lactic acid as a constituent is from 1,000 to 200,000, and a weight composition of the propylene-based polyolefin segment (a) and the segment (b) containing lactic acid as a constituent is from 10/90 to 90/10.

6. An automobile material part comprising the resin composition (D) according to claim 3.

7. A home electric appliance material part comprising the resin composition (D) according to claim 3.

8. An electrical/electronic material part comprising the resin composition (D) according to claim 3.

* * * * *